United States Patent
Fukuoka et al.

(10) Patent No.: US 8,654,696 B2
(45) Date of Patent: Feb. 18, 2014

(54) RADIO COMMUNICATION BASE STATION APPARATUS AND PILOT TRANSMITTING METHOD

(75) Inventors: Masaru Fukuoka, Ishikawa (JP); Akihiko Nishio, Kanagawa (JP); Noriaki Minamida, Ishikawa (JP)

(73) Assignee: Panasonic Corporation, Osaka (JP)

( * ) Notice: Subject to any disclaimer, the term of this patent is extended or adjusted under 35 U.S.C. 154(b) by 1259 days.

(21) Appl. No.: 12/089,391

(22) PCT Filed: Oct. 6, 2006

(86) PCT No.: PCT/JP2006/320117
§ 371 (c)(1),
(2), (4) Date: Apr. 5, 2008

(87) PCT Pub. No.: WO2007/043477
PCT Pub. Date: Apr. 19, 2007

(65) Prior Publication Data
US 2009/0190516 A1 Jul. 30, 2009

(30) Foreign Application Priority Data

Oct. 7, 2005 (JP) .................................. 2005-295446
Oct. 5, 2006 (JP) .................................. 2006-273583

(51) Int. Cl.
*H04W 88/08* (2009.01)
(52) U.S. Cl.
USPC ........................................................ 370/312
(58) Field of Classification Search
USPC ........................................................ 370/312
See application file for complete search history.

(56) References Cited

U.S. PATENT DOCUMENTS

| | | | |
|---|---|---|---|
| 2004/0192201 A1 | 9/2004 | Febvre | |
| 2005/0147025 A1* | 7/2005 | Auer | 370/203 |
| 2007/0036066 A1* | 2/2007 | Thomas et al. | 370/208 |
| 2007/0070944 A1* | 3/2007 | Rinne et al. | 370/329 |
| 2011/0299474 A1* | 12/2011 | Li et al. | 370/328 |

FOREIGN PATENT DOCUMENTS

| | | |
|---|---|---|
| JP | 2000-269876 | 9/2000 |
| JP | 2003-174426 | 6/2003 |
| JP | 2003-244094 | 8/2003 |

(Continued)

OTHER PUBLICATIONS

International Search Report dated Dec. 26, 2006.

(Continued)

*Primary Examiner* — Sulaiman Nooristany
(74) *Attorney, Agent, or Firm* — Dickinson Wright PLLC

(57) ABSTRACT

A base station realizing enhancement of the interpolation accuracy of the channel estimate between sub-frames. In a base station (100), a scrambling section (105) carries out scrambling such that a predetermined pilot signal sequence is multiplied by a scrambling sequence containing both a sequence unique to the base station (100) and different with cells and a sequence common to base stations for each chip and generates a pilot sequence containing both a pilot for unicast sub-frame and a pilot for multicast sub-frame, a multiplexing section (106) for time-multiplexing the pilot sequence, the unicast data symbol, and a multicast data symbol for each sub-frame, and an S/P section (107) converts the pilot sequences, the unicast data symbols, and the multicast data symbols sequential serially inputted from the multiplexing section (106) the numbers of which are equal to the number of subcarries included in one OFDM symbol into parallel ones and outputs them to an IFFT section (108).

16 Claims, 23 Drawing Sheets

(56) References Cited

FOREIGN PATENT DOCUMENTS

| | | |
|---|---|---|
| JP | 2004-350242 | 12/2004 |
| JP | 2006/011347 | 2/2006 |
| JP | 2006-211284 | 8/2006 |
| JP | 2006-287895 | 10/2006 |
| JP | 2006-311359 | 11/2006 |
| JP | 1775901 | 4/2007 |
| JP | 1881628 | 1/2008 |
| WO | 2004/039011 | 5/2004 |

OTHER PUBLICATIONS

3GPP RAN WG1 Ad Hoc on LTE (Jun. 2005) R1-050589, "Pilot channel and scrambling code in evolved UTRA downlink," Jun. 2005, pp. 1-24.

3GPP RAN WG1 Ad Hoc on LTE (Jun. 2005) R1-050590, "Physical channels and multiplexing in evolved UTRA downlink" Jun. 2005, pp. 1-24.

* cited by examiner

RADIO COMMUNICATION BASE STATION APPARATUS AND PILOT TRANSMITTING METHOD

TECHNICAL FIELD

The present invention relates to a radio communication base station apparatus and a pilot transmission method.

BACKGROUND ART

Recently, in mobile communications, various information such as image and data in addition to audio are targets for information transmission. With this trend, demands for high-reliable, high-speed transmission are increased. However, when high-speed transmission is performed in mobile communication, the influence of delay waves due to multi-path cannot be avoided, and transmission performances degrade due to frequency selective fading.

As a technique for avoiding frequency selective fading, multicarrier communication represented by the OFDM (Orthogonal Frequency Division Multiplexing) scheme has attracted attention. The multicarrier communication is a technique of performing high-speed transmission by transmitting data using a plurality of subcarriers where the level of transmission speed is suppressed not to cause frequency selective fading. To be more specific, in the OFDM scheme, frequencies of a plurality of subcarriers in which data is mapped are orthogonal to each other, so that the OFDM scheme provides the highest frequency efficiency in multicarrier communications and can be realized by relatively simple hardware constitution. Therefore, the OFDM scheme has attracted attention as a communication method employed by cellular scheme mobile communications, and has been studied variously. Further, according to the OFDM scheme, to avoid ISI (Intersymbol Interference), the tail end part of an OFDM symbol is attached to the head of that of OFDM symbol as a CP (Cyclic Prefix). By this means, it is possible to prevent ISI as long as the delay time of delay waves stays within the time length of CP (hereinafter "CP length").

On the other hand, recently, multicast communication has been studied. Multicast communication is not one-to-one communication such as unicast communication, but is one-to-many communication. That is, in multicast communication, one radio communication base station apparatus (hereinafter "base station") transmits the same data to a plurality of radio communication mobile station apparatuses (hereinafter "mobile stations") at the same time. By this multicast communication, in mobile communication systems, for example, delivery services of music data and video image data and broadcast services such as television broadcast are realized. Further, services using multicast communication are assumed to be services for relatively wide communication areas that cannot be covered by one base station, and, consequently, multicast communication covers wide communication areas entirely by transmitting the same data from a plurality of base stations. By this means, data for multicast communication (multicast data) is transmitted through a multicast channel shared by a plurality of base stations. Thus, in the multicast channel, the same data is transmitted from a plurality of base stations at the same time, and, consequently, a mobile station nearby the cell boundary receives mixed multicast data comprised of multiple multicast data from a plurality of base stations.

Here, if the OFDM scheme is employed in multicast communication, in a mobile station nearby the cell boundary, when a plurality of the same OFDM symbols transmitted from a plurality of base stations at the same time are received successively within time for the CP length, these OFDM symbols are combined and this combined OFDM symbol with amplified, received power is received. To compensate a channel fluctuation (phase fluctuation and amplitude fluctuation) of the combined signal by channel estimation, the channel estimation value of the combined signal is needed. Therefore, in multicast communication using the OFDM scheme, pilots used for estimating the channel estimation value need to be transmitted from a plurality of base stations at the same time, as in the case of multicast data.

On the other hand, in a unicast channel, a plurality of base stations transmit mutually different data (unicast data) (see Non-Patent Document 1). By this means, unicast data is multiplied by the scrambling code unique to each base station on a per cell basis such that unicast data from each of a plurality of base stations can be classified in a mobile station. By this means, according to unicast communication, pilots used for calculating a channel estimation value is multiplied by the scrambling code unique to each base station as in the case of unicast data.

Further, as shown in FIG. 1, studies are conducted for time-multiplexing unicast data and multicast data on a per subframe basis and switching between the unicast channel and the multicast channel over time upon use (see Non-Patent Document 2). This document discloses one frame formed with subframes #1 to #20, that is, with twenty subframes, as an example. Further, above-described pilot (P) that differs between unicast data and multicast data is time-multiplexed over the head of each subframe. Further, in FIG. 1, multicast data is multiplexed every three subframes, as an example of a frame structure.

Non-Patent Document 1: 3GPP RAN WG1 LTE Adhoc meeting (2005.06) R1-050589 "Pilot channel and scrambling code in evolved UTRA downlink"

Non-Patent Document 2: 3GPP RAN WG1 LTE Adhoc meeting (2005.06) R1-050590 "Physical channels and multiplexing in evolved UTRA downlink"

DISCLOSURE OF INVENTION

Problems to be Solved by the Invention

As shown in FIG. 1, when pilots are time-multiplexed over the heads of subframes, the channel estimation value calculated by using the pilots is used for overall subframe data. Consequently, while the accuracy of compensation is high in the head part of a subframe, the accuracy of compensation becomes lower gradually towards the tail end. To prevent degradation of accuracy, interpolation processing may be performed for channel estimation values between subframes. For example, in FIG. 1, the channel estimation value for unicast data of subframe #1 is calculated from performing interpolation processing between the channel estimation value calculated from the pilot for subframe #1 and the channel estimation value calculated from the pilot for subframe #2, the channel estimation value for unicast data in subframe #2 is calculated from performing interpolation processing between the channel estimation value calculated from the pilot for subframe #2 and the channel estimation value calculated from the pilot for subframe #3, and the channel estimation value for unicast data in subframe #3 is calculated from performing interpolation processing between the channel estimation value calculated from the pilot for subframe #3 and the channel estimation value calculated from the pilot for subframe #4.

However, in subframes of unicast data and subframes of multicast data, mutually different pilots are transmitted as described above. Consequently, in a mobile station, while the channel estimation value is calculated based on pilots from one base station being in communication with the mobile station in subframes of unicast data, the channel estimation value is calculated based on a combined signal formed with pilots from a plurality of base stations in subframes of multicast data. By this means, while a channel estimation value calculated from subframes of unicast data shows the condition of one channel, a estimation value calculated from subframes of multicast data shows the conditions of a mixed channel formed with a plurality of channel conditions. Therefore, if the above-described interpolation processing is performed between these channel estimation values, the accuracy of compensation degrades significantly. By this means, according to the received signal compensation using a channel estimation value calculated from interpolation processing, the accuracy of compensation degrades significantly, and, as a result, error rate performances degrade. To be more specific, in FIG. 1, the accuracy of interpolation is low in the interpolation processing between the channel estimation value calculated from the pilot for subframe #2 (unicast data) and the channel estimation value calculated from the pilot for subframe #3 (multicast data), and, consequently, the error rate performances of unicast data in subframe #2 degrade. Further, similarly, the accuracy of interpolation is low in the interpolation processing between the channel estimation value calculated from the pilot for subframe #3 (multicast data) and the channel estimation value calculated from the pilot for subframe #4 (unicast data), and, consequently, the error rate performances of multicast data in subframe #3 degrade.

As described above, when unicast data and multicast data are time-multiplexed and interpolation processing is performed for channel estimation values between these data, the error rate performances degrade in the subframe for unicast data immediately before a subframe for multicast data and in the subframe for multicast data immediately before a subframe for unicast data.

It is therefore an object of the present invention to provide a base station and pilot transmission method that improves the accuracy of interpolation for channel estimation values between subframes.

Means for Solving the Problem

The base station used in a radio communication system where a first subframe used to transmit mutually different data between a plurality of cells or a plurality of sectors and a second subframe used to transmit mutually same data between the plurality of cells or the plurality of sectors, are time-multiplexed, employs a configuration having: a generating section that generates a first pilot sequence comprising both a pilot for the first subframe and a pilot for the second subframe; and a multiplexing section that multiplexes the second pilot sequence by the first subframe.

Advantageous Effect of the Invention

According to the present invention, it is possible to improve the accuracy of interpolation for channel estimation values between subframes.

BEST MODES FOR CARRYING OUT THE INVENTION

Embodiments of the present invention will be explained below in detail with reference to the accompanying drawings.

Embodiment 1

The base station according to the present embodiment is used in a radio communication system. In this radio communication system, subframes which a plurality of base stations use to transmit mutually different data and subframes which a plurality of base stations use to transmit mutually same data, are time-multiplexed. In particular, the base station according to the present embodiment is adequate for a radio communication system where subframes for unicast data (hereinafter "unicast subframes") and subframes for multicast data (hereinafter "multicast subframes") are time-multiplexed, as shown in above-described FIG. 1. Therefore, in the following explanations, as an example, unicast subframes are used as the subframes which a plurality of base stations use to transmit mutually different data, and multicast subframes are used as the subframes which a plurality of base stations use to transmit the same data. Further, the frame structure according to the present embodiment is the same as in FIG. 1.

Figure 2:
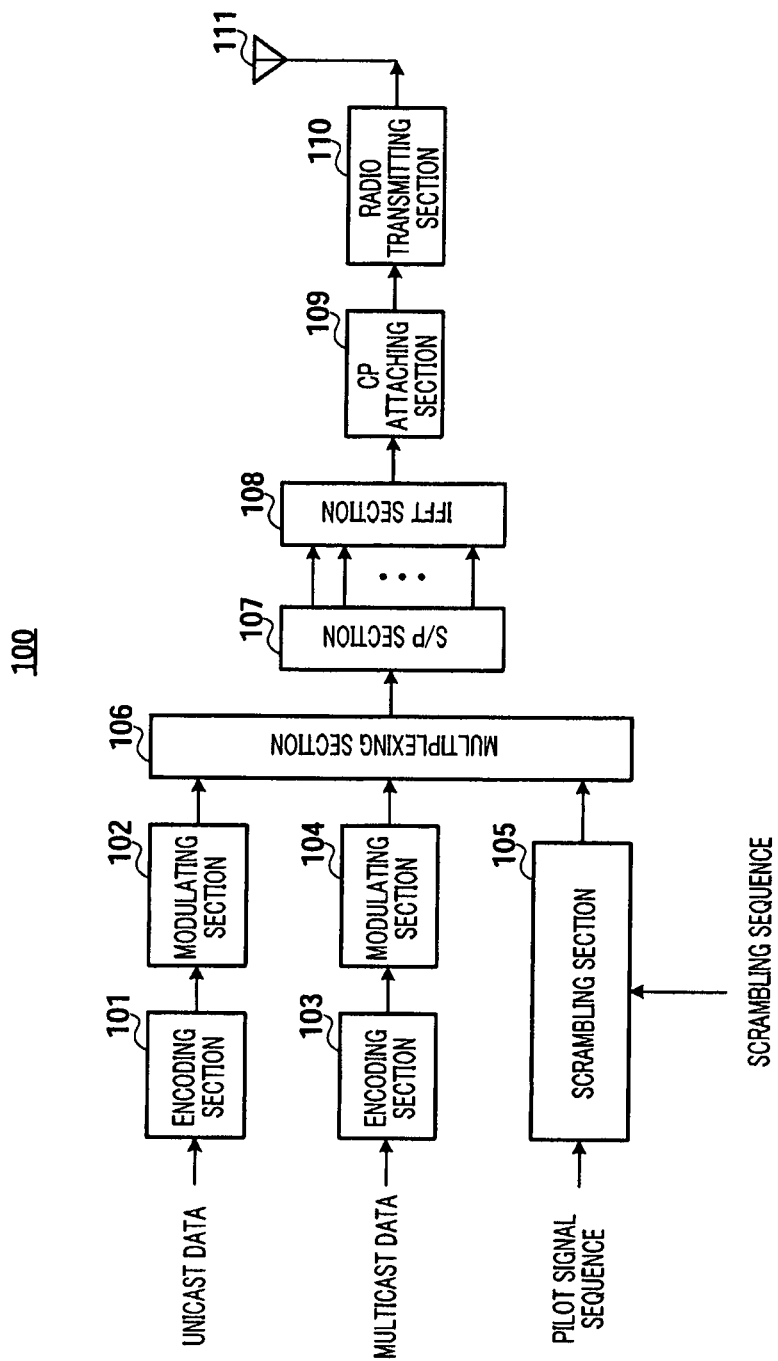
FIG. 2 is a block configuration diagram showing a base station according to Embodiment 1 of the present invention.
Figure 3:
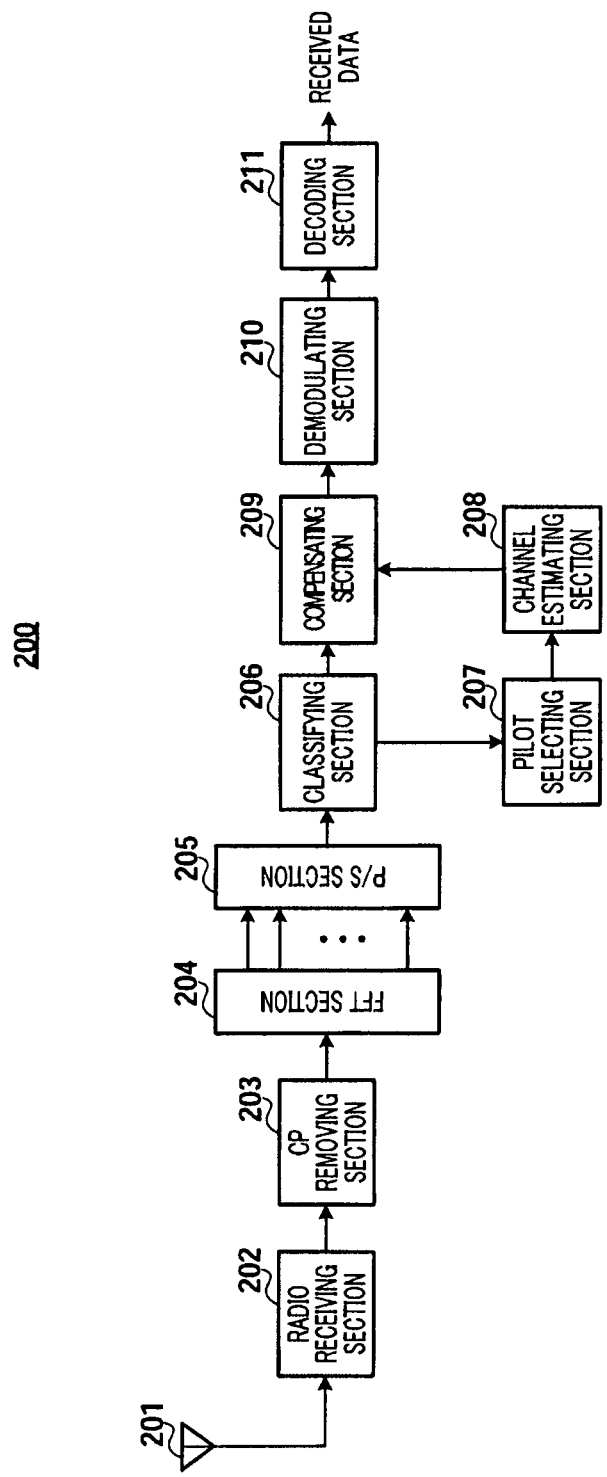
FIG. 3 is a block configuration diagram showing a mobile station according to Embodiment 1 of the present invention.

FIG. 2 illustrate the configuration of base station 100 according to the present embodiment and FIG. 3 illustrates the configuration of mobile station 200 according to the present embodiment.

In base station 100 shown in FIG. 2 encoding section 101 encodes unicast data and outputs the encoded unicast data to modulating section 102.

Modulating section 102 generates unicast data symbols by modulating the encoded unicast data and outputs the generated unicast data symbols to multiplexing section 106.

Encoding section 103 encodes multicast data and outputs the encoded multicast data to modulating section 104.

Modulating section 104 generates multicast data symbols by modulating the encoded multicast data and outputs the generated multicast data symbols to multiplexing section 106.

Scrambling section 105 performs scrambling processing of multiplying a pilot signal sequence by a scrambling sequence including a sequence that is unique to base station 100 (unique sequence) and that differs between a plurality of cells, and a sequence common in a plurality of base stations (common sequence) on a per chip basis, to generate a pilot sequence including the pilot for unicast subframes and the pilot for multicast subframes, and outputs this generated pilot sequence to multiplexing section 106.

Figure 1:
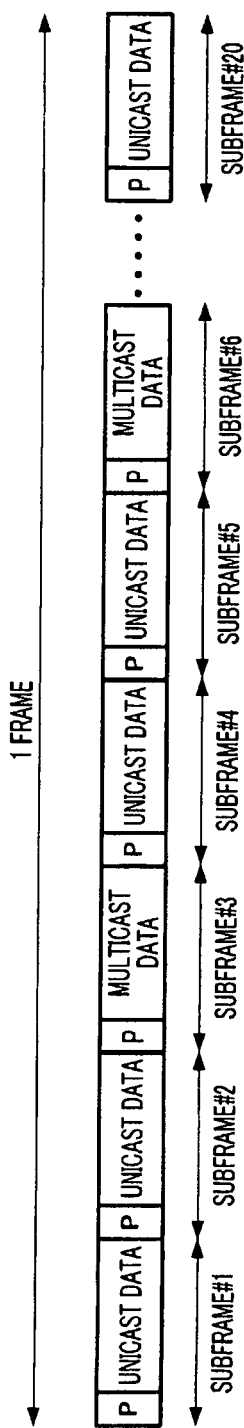
FIG. 1 illustrates an example of a conventional frame structure.

Multiplexing section 106 time-multiplexes the pilot sequence, unicast data symbol and multicast data symbol according to the frame structure shown in FIG. 1, and outputs the result to S/P section 107. As shown in FIG. 1, this time-multiplexing is performed on a per subframe basis. Further, the pilot sequence is multiplexed over the head of each subframe.

S/P section 107 converts in parallel the pilot sequence, unicast data symbol and multicast data symbol, which are consecutively inputted in sirial from multiplexing section 106, into units of subcarriers included in one OFDM symbol, and outputs the result to IFFT (Inverse Fast Fourier Transform) section 108. By this means, the pilot sequence, the unicase data symbol and multicast data symbol are assigned to subcarriers forming an OFDM symbol.

IFFT section 108 converts time domain signals by performing an IFFT for a plurality of subcarriers to which the pilot sequence, unicast data symbol and multicast data symbol are assigned, to generate an OFDM symbol, which is a multicarrier signal. This generated OFDM symbol is outputted to CP attaching section 109.

CP attaching section attaches a signal corresponding to the tail end part of an OFDM symbol to the head of that OFDM symbol as a CP.

Radio transmitting section 110 performs transmitting processing such as D/A conversion, amplification and up-conversion on the OFDM symbol with a CP, and transmits the result from antenna 111 to mobile station 200 (shown in FIG. 3).

In mobile station 200 shown in FIG. 3, radio receiving section 202 receives the OFDM symbol transmitted from base station 100 (shown in FIG. 2) via antenna 201, performs receiving processing such as down-conversion and A/D conversion on the received OFDM symbol, and outputs the OFDM symbol after receiving processing to CP removing section 203.

CP removing section 203 removes the CP attached to the OFDM symbol and outputs the OFDM symbol without the CP to FFT section 204.

FFT section 204 converts the OFDM symbol inputted from CP removing section 203 into frequency domain signals by an IFFT, acquires a pilot sequence, unicast data symbols or multicast data symbols, and outputs these corresponding to the number of subcarriers to P/S section 205 in parallel.

P/S section 205 converts the pilot sequence, unicast data symbol and multicast data symbol inputted in parallel from FFT section 204 into serial data and outputs the serial data to classifying section 206.

Classifying section 206 classifies the pilot sequence from the data symbol, and outputs the pilot sequence to pilot selecting section 207 and outputs unicast data symbol and multicast data symbol to compensating section 209.

Pilot selecting section 207 selects from the pilot sequence the pilot signal matching the kind of data that is subject to channel estimation. When a unicast data symbol is outputted from classifying section 206 to compensating section 209, that is, in the unicast subframe, pilot selecting section 207 selects the pilot for unicast subframes and outputs the pilot to channel estimating section 208. When a multicast data symbol is outputted from classifying section 206 to compensating section 209, that is, in the multicast subframe, pilot selecting section 207 selects the pilot for multicast subframes and outputs the pilot to channel estimating section 208. Further, in mobile station 200, interpolation processing is performed for the channel estimation value between subframes, and, consequently, pilot selecting section 207 selects the pilot for the current subframe and for the next subframe. For example, when a channel estimation is performed for unicast data of subframe #2 shown in FIG. 1, pilot selecting section 207 selects the pilot for unicast subframes from the pilot sequences at the head of subframe #2 and subframe #3. Further, for example, when a channel estimation is performed for multicast data of subframe #3 shown in FIG. 1, pilot selecting section 207 selects the pilot for multicast subframes from the pilot sequences at the head of subframe #3 and subframe #4.

Channel estimating section 208 calculates channel estimation values using the pilot selected by pilot selecting section 207. Further, channel estimating section 208 performs interpolation processing between subcarriers and between subframes using the calculated estimation values, and calculates channel estimation values for all data symbols included in the subframes.

Compensating section 209 compensates channel fluctuation of the unicast data symbol and the multicast data symbol using the channel estimation values calculated by channel estimating section 208, and outputs the compensated data symbols to demodulating section 210. Compensating section 209 compensates the channel fluctuation of each data symbol by multiplying each data symbol by the complex conjugate of the channel estimation value.

Demodulating section 210 demodulates each data symbol outputted from compensating section 209 and outputs the demodulated data symbol to decoding section 211.

Decoding section 211 decodes the demodulated data symbol. By this means, received data is yielded.

Next, the method of generating a scrambling sequence used for scrambling processing in scrambling section 105 of base station 100, will be explained. This scrambling sequence is generated by replacing part of a scrambling code which is a unique sequence, by a common sequence, as described below.

Figure 4:
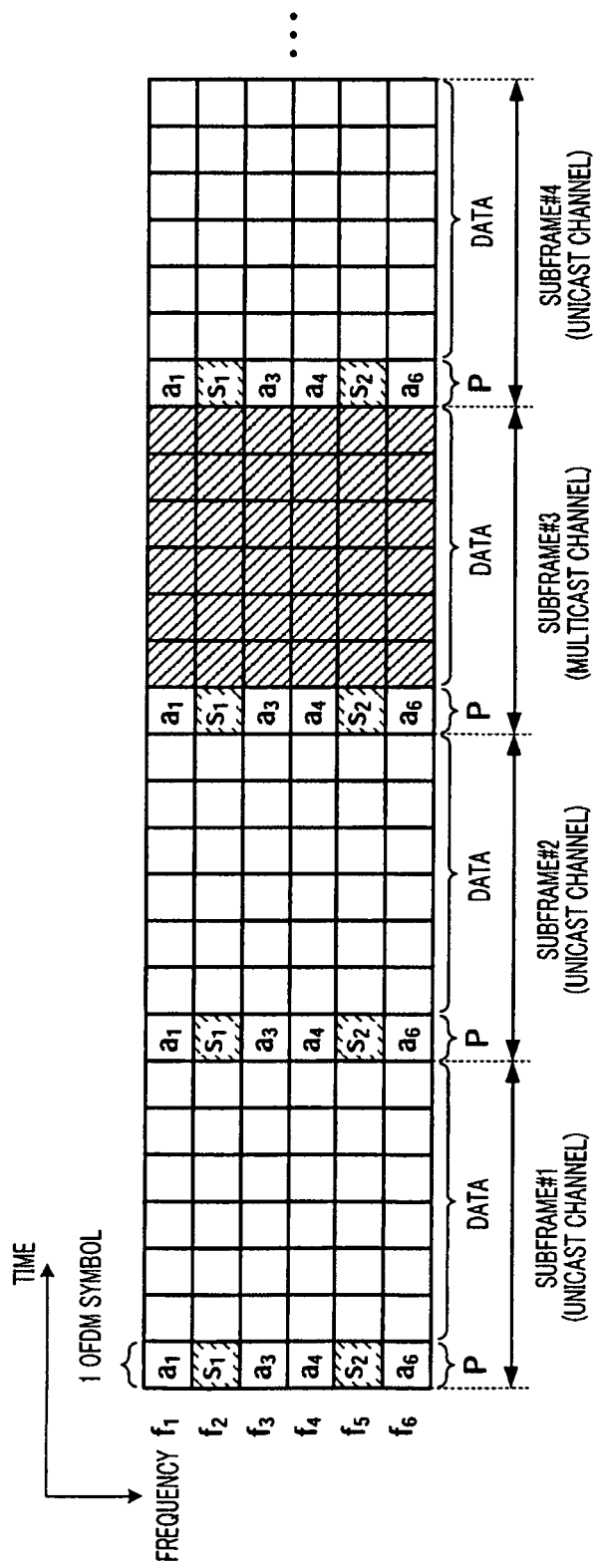
FIG. 4 illustrates an example of pilot sequence multiplexing according to Embodiment 1 of the present invention (cell A)

That is, if the scrambling code unique to base station 100 is comprised of chips $a_1, a_2, a_3, \ldots, a_N$ (here, N represents the number of subcarriers included in one OFDM symbol), the common sequence is comprised of chips $s_1, s_2, s_3, \ldots, s_M$ (here, M<N/2) and the pilot signal sequence is comprised of chips $p_1, p_2, p_3, \ldots, p_N$, for example, a scrambling sequence is generated by replacing every third chip by the common sequence from the second chip as a starting point. Therefore, the generated scrambling sequence is $a_1, s_1, a_3, a_4, s_2, a_6, \ldots, s_M, \ldots, a_N$, and this scrambling sequence includes both the unique sequence and the common sequence. Further, scrambling section 105 multiplies the pilot signal sequence $p_1, p_2, p_3, \ldots, p_N$ by this scrambling sequence $a_1, s_1, a_3, a_4, s_2, a_6, \ldots, s_M, a_N$. By this multiplication, the pilot sequence $a_1 \cdot p_1$, $s_1 \cdot p_2, a_3 \cdot p_3, a_4 \cdot p_4, s_2 \cdot p_5, a_6 \cdot p_6, \ldots, s_M \cdot p_{3M-1}, \ldots, a_N \cdot p_N$ is generated. If the sequence $p_1 = p_2 = p_3 = \ldots = p_N = 1$ is used as the pilot signal sequence for ease of explanation, the scrambling sequence $(a1, s1, a3, a4, s2, a6, \ldots, s_M, \ldots, a_N)$ itself generated as above is the pilot sequence. As shown in FIG. 4, this pilot sequence $a_1, s_1, a_3, a_4, s_2, a_6, \ldots, s_M, \ldots, a_N$ is then multiplexed over the head of each subframe by multiplexing section 106. FIG. 4 shows a case where N is 6 and one OFDM symbol is comprised of subcarriers $f_1$ to $f_6$, for ease of explanation. That is, in FIG. 4, the pilot sequence $a_1, a_3, a_4, a_6$ is unique to base station 100, and, consequently, the pilot sequence $a_1, a_3, a_4, a_6$ can be used as the pilot for unicast subframes. On the other hand, the pilot sequence $s_1, s_2$ is common in a plurality of base stations, and, consequently, the pilot sequence $s_1, s_2$ can be used as the pilot for multicast subframes. Thus, the pilot sequence generated by scrambling section 105 includes both pilots for unicast subframes and pilots for multicast subframes.

Further, to be sufficiently responsive to channel fluctuation in the frequency domain upon a channel estimation in mobile station 200, when the pilot sequence includes a plurality of pilots $s_1$ for multicast subframes as described above, the intervals between these pilots in the frequency domain are set within the coherent bandwidth of a channel. By this means, scrambling section 105 generates a pilot sequence where the intervals between pilots $s_1$ and $s_2$ for multicast subframes in the frequency domain stay within the coherent bandwidth of a channel.

Further, pilots for multicast subframes are the same at a plurality of base stations, and, consequently, interference is not caused between base stations. Therefore, the number of pilots for multicast subframes in the pilot sequence may be a minimum possible number to be responsive to channel fluctuation. On the other hand, pilots for unicast subframes differ between base stations, and, consequently, interference is caused between base stations. To suppress this interference by, for example, averaging processing, many pilots are needed. Therefore, with the present invention, as described above, the number of pilots for unicast subframes is set such that the number is greater than the number of pilots for multicast subframes, in the pilot sequence. Here, scrambling section 105 generates the pilot sequence where pilots for multicast subframes are two ($s_1$ and $s_2$) and pilots for unicast subframes are four ($a_1, a_3, a_4, a_6$).

Figure 5:
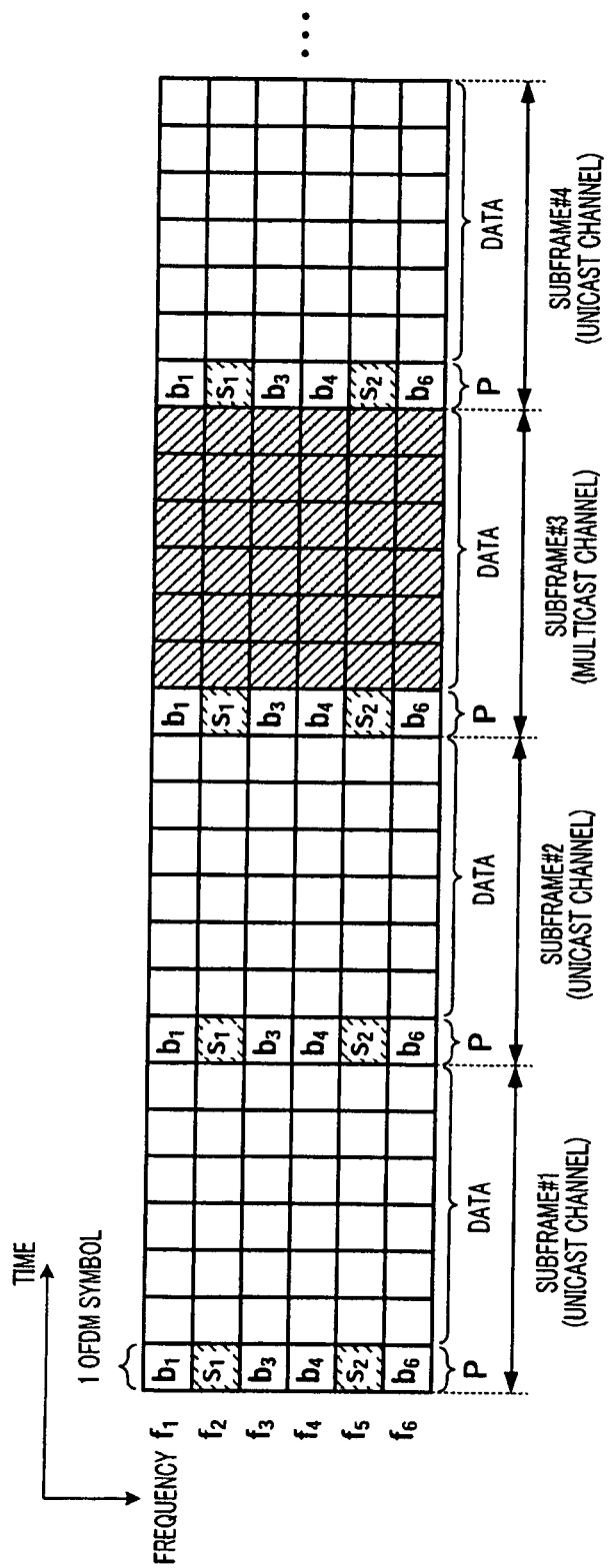
FIG. 5 illustrates an example of pilot sequence multiplexing according to Embodiment 1 of the present invention (cell B)

Next, a method of calculating a channel estimation value in channel estimating section 208 of mobile station 200 will be explained. Here, as shown in FIG. 4, base station 100 of cell A transmits the pilot sequence $a_1, s_1, a_3, a_4, s_2, a_6$ in the head of each subframe, and, as shown in FIG. 5, base station 100 of cell B employing the same configuration as in cell A transmits the pilot sequence $b_1, s_1, b_3, b_4, s_2, b_6$ in the head of each subframe. Further, mobile station 200 is assumed to be positioned in cell A.

Figure 6:
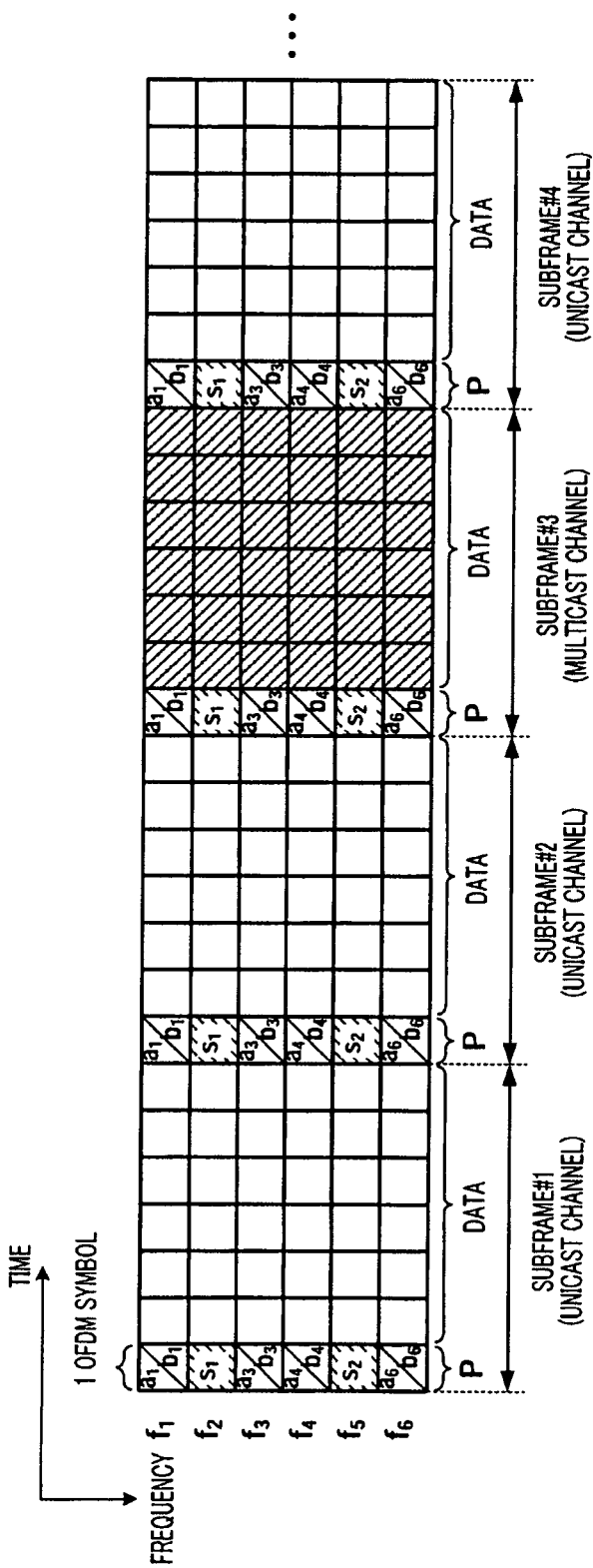
FIG. 6 illustrates an example of a received pilot sequence according to Embodiment 1 of the present invention.

As shown in FIG. 6, in mobile station 200, the pilot sequence $a_1, s_1, a_3, a_4, s_2, a_6$ and the pilot sequence $b_1, s_1, b_3, b_4, s_2, b_6$ are combined over a channel and received. Therefore, the pilot sequence received in mobile station 200 is comprised of $a_1h_1+b_1l_1$, $s_1(h_2+l_2)$, $a_3h_3+b_3l_3$, $a_4h_4+b_4l_4$, $s_2(h_5+l_5)$, $a_6h_6+b_6l_6$. Here, $h_i$ represents the channel for cell A and $l_i$ represents the channel for cell B. That is, the pilot sequence received at mobile station 200 is comprised of $s_i(h_i+l_i)$ that is the pilot for multicast subframes and $a_ih_i+b_il_i$ that is the pilot for unicast subframes.

Figure 7:
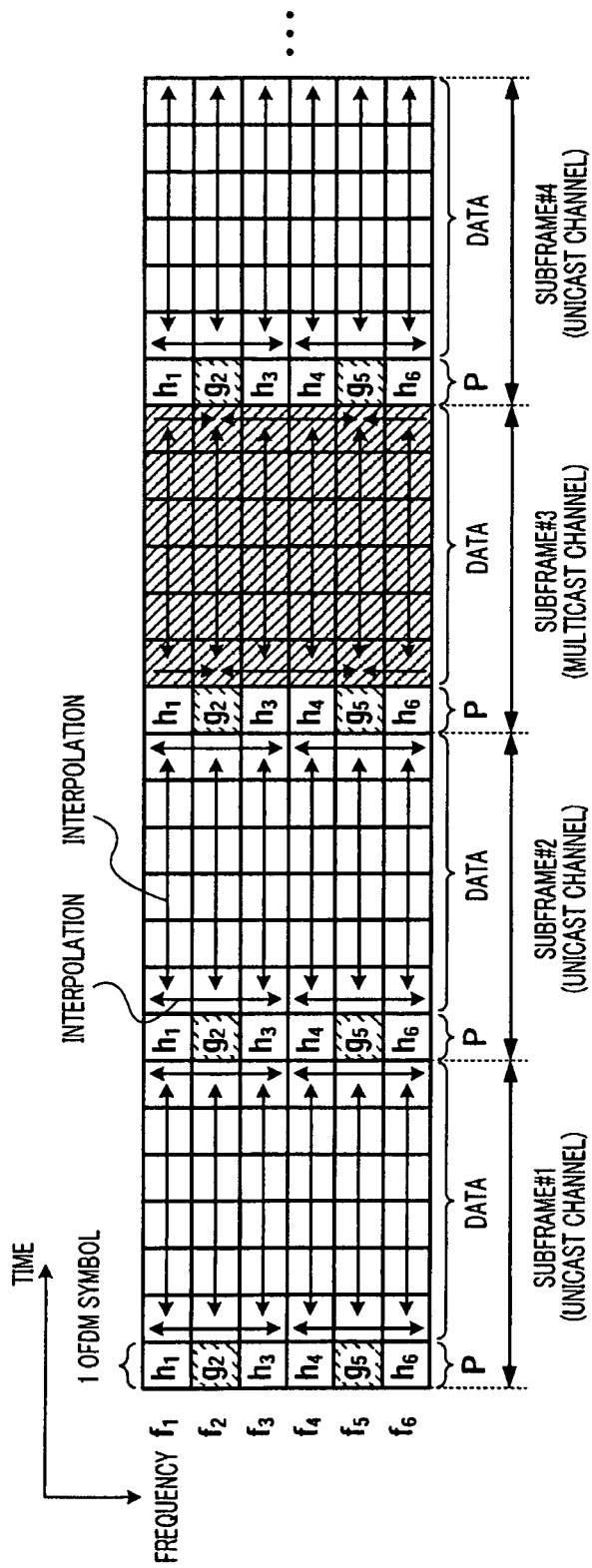
FIG. 7 illustrates channel estimation values according to Embodiment 1 of the present invention.

As shown in FIG. 7, channel estimating section 208 then calculates a channel estimation value.

That is, when a channel estimation is performed for multicast data (data of subframe #3), as described above, pilot selecting section 207 selects received pilots $s_1(h_2+l_2)$ and $s_2(h_5+l_5)$ in subcarriers $f_2$ and $f_5$ from the received pilot sequence in the head of subframe #3. Channel estimating section 208 calculates the channel estimation value $g_2=h_2+l_2$ by multiplying pilot $s_1(h_2+l_2)$ by the complex conjugate of $s_1$, and also calculates the channel estimation value $g_5=h_5+l_5$ by multiplying pilot $s_2(h_5+l_5)$ by the complex conjugate of $s_2$. The same processing is performed in subframe #4, and, as a result, $g_2$ and $g_5$ are yielded. As shown in FIG. 7, channel estimating section 208 performs interpolation processing between subcarriers using $g_2$ and $g_5$ in the head of subframe #3 and subframe #4, and calculates the rest of the channel estimation values $g_1, g_3, g_4, g_6$ in the head of subframe #3 and subframe #4. Further, as shown in FIG. 7, channel estimating section 208 performs interpolation processing on channel estimation values $g_1$ to $g_6$ between the head of subframe #3 and the head of subframe #4, and calculates channel estimation values for all multicast data symbols included in subframe #3.

On the other hand, when channel estimation is performed for unicast data (data of subframe #2), as described above, pilot selecting section 207 selects the received pilots $a_1h_1+b_1l_1, a_3h_3+b_3l_3, a_4h_4+b_4l_4, a_6h_6+b_6l_6$ in subcarriers $f_1, f_3, f_4, f_6$, from the received pilot sequence in the head of subframe #2. As shown in following equation 1, channel estimating section 208 multiplies the pilot $a_1h_1+b_1l_1$ by the complex conjugate of $a_1$ and multiplies the pilot $a_3h_3+b_3l_3$ by the complex conjugate of $a_3$, and adds the multiplied results. Further, channels are almost the same between adjacent subcarriers, and, consequently, $h_1+h_3$ equals $2h_1$ in equation 1.

(Equation 1)

$$a_1^* \cdot (a_1 h_1 + b_1 l_1) + a_3^* \cdot (a_3 h_3 + b_3 l_3) =$$
$$(h_1 + h_3) + (a_1^* b_1 l_1 + a_3^* b_3 l_3) = 2h_1 + (a_1^* b_1 l_1 + a_3^* b_3 l_3)$$  [1]

Here, if pilots $a_1$, $a_3$, $b_1$, $b_3$ are not regulated to each other, these are not reinforced each other, and, consequently, the value of the second item of the calculation result in equation 1 is sufficiently smaller than $2h_1$, and can be ignored. Therefore, the calculation result is $2h_1$ in equation 1 and channel estimation value $h_1$ is calculated. As described above, upon calculating a channel estimation value of unicast data, channel estimating section 208 averages the estimation values between adjacent subcarriers to suppress interference element $l_i$.

Channel estimating section 208 performs the above-described calculation between pilots $a_3 h_3 + b_3 l_3$, $a_4 h_4 + b_4 l_4$, $a_6 h_6 + b_6 l_6$ and calculates channel estimation values $h_3$, $h_4$, $h_6$. Further, the same processing is performed in subframe #3 and $h_1$, $h_3$, $h_4$, $h_6$ are acquired. As shown in FIG. 7, channel estimating section 208 then performs interpolation processing between subcarriers using $h_1$, $h_3$, $h_4$, $h_6$ in the head of subframe #2 and subframe #3, and calculates the rest of the estimation values $h_2$, $h_5$ in the head of subframe #2 and subframe #3. Further, as shown in FIG. 7, channel estimating section 208 performs interpolation processing on channel estimation values $h_1$ to $h_6$ between the head of subframe #2 and the head of subframe #3, and calculates channel estimation values for all unicast data symbols included in subframe #2. Further, although a case has been described with the above-described explanations where received pilots $s_1(h_2 + l_2)$, $s_2(h_5 + l_5)$ are not used in calculating channel estimation values for the unicast data symbol, when mobile station 200 is close to the center of cell A and the value of $h_1$ is sufficiently greater than $l_i$, the accuracy of channel estimation is improved by calculating channel estimation values for the unicast data symbol using these received pilots.

Thus, according to the present embodiment, in each subframe, base station 100 transmits the pilot sequence including the pilot for unicast subframes and the pilot for multicast subframes. Consequently, as described above, mobile station 200 can perform interpolation processing between channel estimation values showing the condition of one channel, and between channel estimation values showing the condition of a plurality of channels, so that the unicast channel and the multicast channel are time-multiplexed on a per subframe basis and the accuracy of interpolation is improved even when interpolation processing is performed on the channel estimation values between these channels. Therefore, according to the present embodiment, it is possible to prevent degradation of error rate performances due to the low accuracy of interpolation for channel estimation values.

Further, according to the present embodiment, only by performing simple processing of multiplying the conventional pilot signal sequence by the sequence generated by replacing part of the conventional scrambling code by the common sequence, it is possible to generate a pilot sequence including both the pilot for unicast subframes and the pilot for multicast subframes.

Further, according to the present embodiment, a single pilot structure enables channel estimations to be performed for unicast data and multicast data, so that it is possible to realize a simple communication system.

Further, although a case has been described with the above explanations where the pilot sequence is multiplexed over the head of each subframe (in the first OFDM symbol) as an example, for example, when control information is multiplexed over the head of each subframe, the pilot sequence may be multiplexed over the head of each subframe in the second or later OFDM symbol.

Further, although a case has been described with the above explanations where only the pilot signal sequence is multiplied by the scrambling sequence, unicast data symbol and multicast data symbol may be multiplied by the scrambling sequence. Further, the unicase data symbol and multicast data symbol may be multiplied by the scrambling code unique to base station 100.

Further, although a case has been described with the above explanations where the scrambling sequence is generated by replacing part of the scrambling code by the common sequence, the scrambling sequence may be generated by inserting the chip of the common sequence between chips of the scrambling code.

Further, the transmission power for the pilot for multicast subframes may be set smaller than the transmission power for the pilot for unicast subframes. The total transmission power for base station 100 has a limit, and, consequently, by decreasing the transmission power for the pilot for multicast subframes which do not occur interference between base stations and increasing the transmission power for the pilot for unicast subframes which occur interference between base stations in return, it is possible to suppress degradation of error rate performances of unicast data due to interference.

Figure 8:
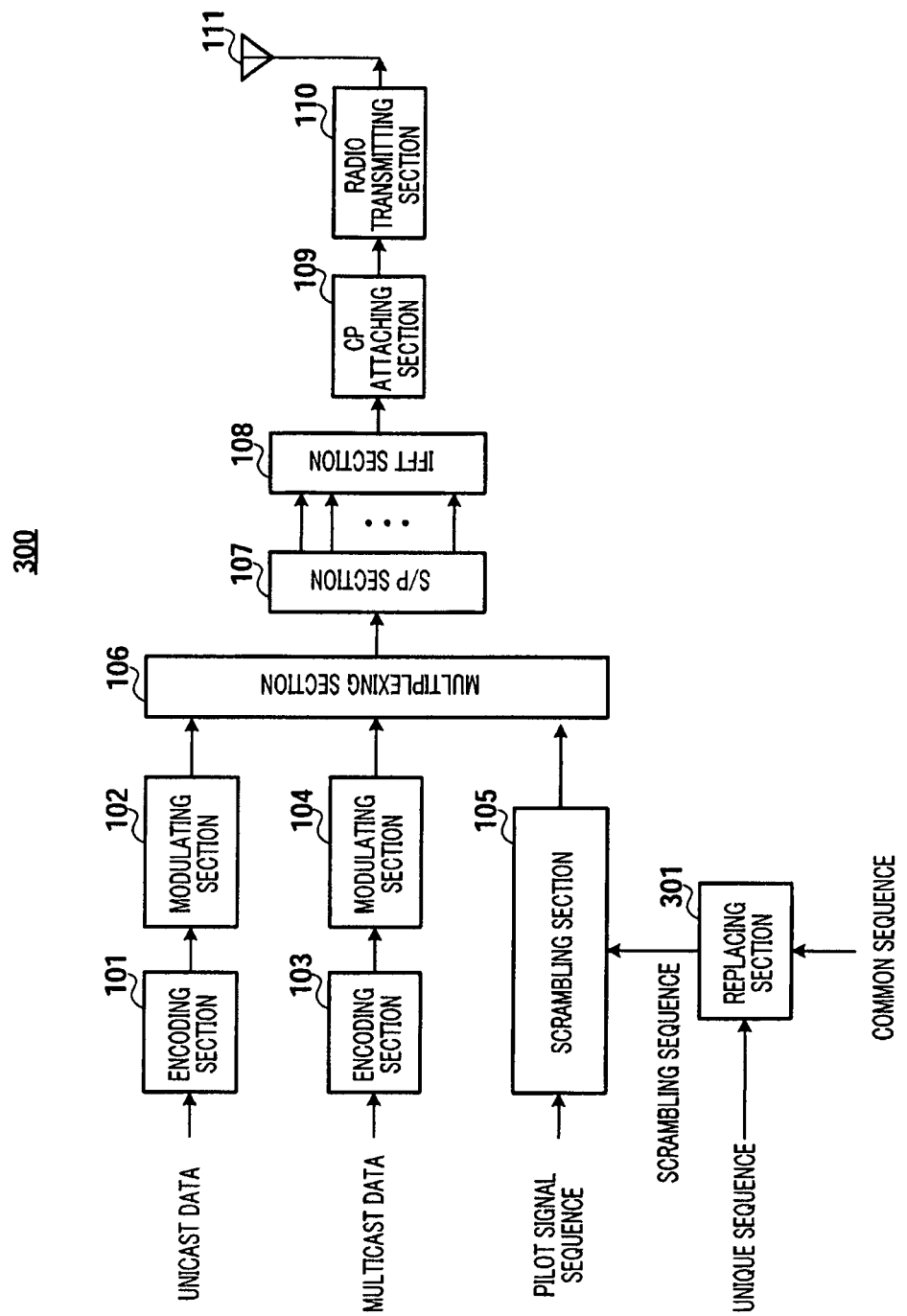
FIG. 8 is a block configuration diagram showing a base station according to Embodiment 1 of the present invention (variation)

Further, although a case has been described with the above explanation where the scrambling sequence generated in advance is set in advance in base station 100 and the scrambling sequence does not change, in a radio communication system where the unique sequence (scrambling code) can be changed by a radio line control station apparatus (hereinafter "control station") that is higher than base station 100, the desirable configuration of the base station is that shown in FIG. 8. Base station 300 shown in FIG. 8 employs a configuration further having replacing section 301 in addition to the configuration shown in FIG. 2. The control station reports the unique sequence and the common sequence to base station 300, and replacing section 301 generates the scrambling sequence by replacing part of the unique sequence by the common sequence in the same way as above. Further, although the pilot signal sequence is multiplied by the scrambling sequence generated in replacing section 301 according to this configuration, the pilot sequence may be generated by directly multiplying the pilot signal sequence by the scrambling code, and, after the pilot sequence is generated, part of the pilot sequence may be replaced by the common sequence by replacing section 301.

Figure 9:
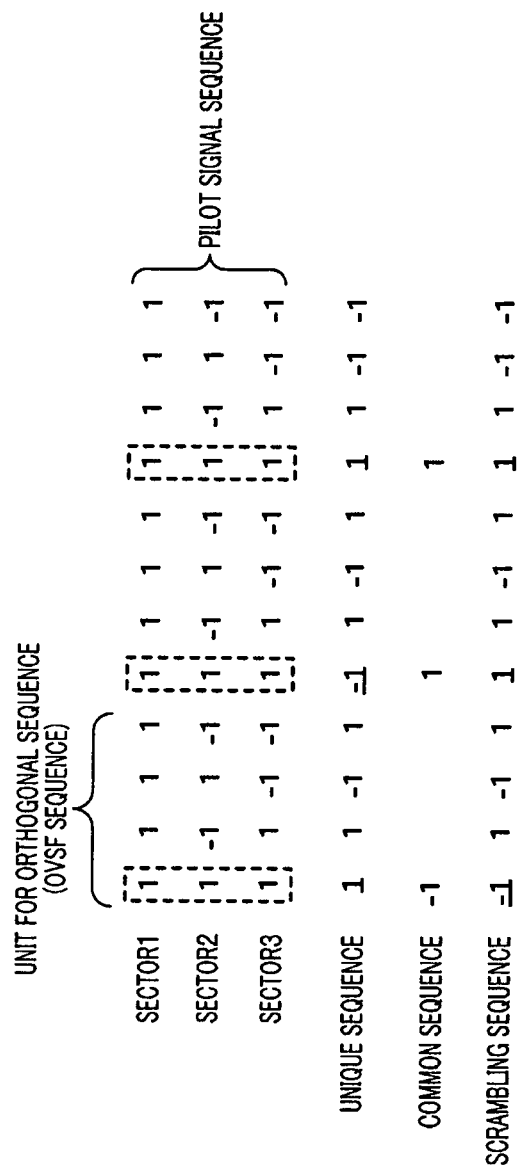
FIG. 9 illustrates an example of scrambling sequence generation according to Embodiment 1 of the present invention.

Further, if one cell is divided into a plurality of sectors, a predetermined pilot signal sequence that differs between sectors may be set. Here, to reduce interference between sectors, the orthogonal sequence such as the OVSF sequence may be used as a predetermined pilot signal sequence. In this case, the orthogonal sequence used for each sector is common in all cells. Consequently, in this case, the pilot signal sequence (orthogonal sequence) is multiplied by the scrambling code that is unique to the base station and that differs between cells. In this radio communication system, as shown in FIG. 9, out of chips of the scrambling code (unique sequence), the scrambling code may be generated by replacing parts corresponding to chips where phase (1, −1) is identical in all sectors of the pilot signal sequence, by the common sequence common in all cells. By this means, even when a different pilot signal sequence is set for each of a plurality of sectors forming a cell, in the same way as above, it is possible to generate a scrambling sequence including both a unique sequence and a common sequence, and generate a pilot sequence including both the pilot for unicast subframes and the pilot for multicast subframes.

Figure 10:
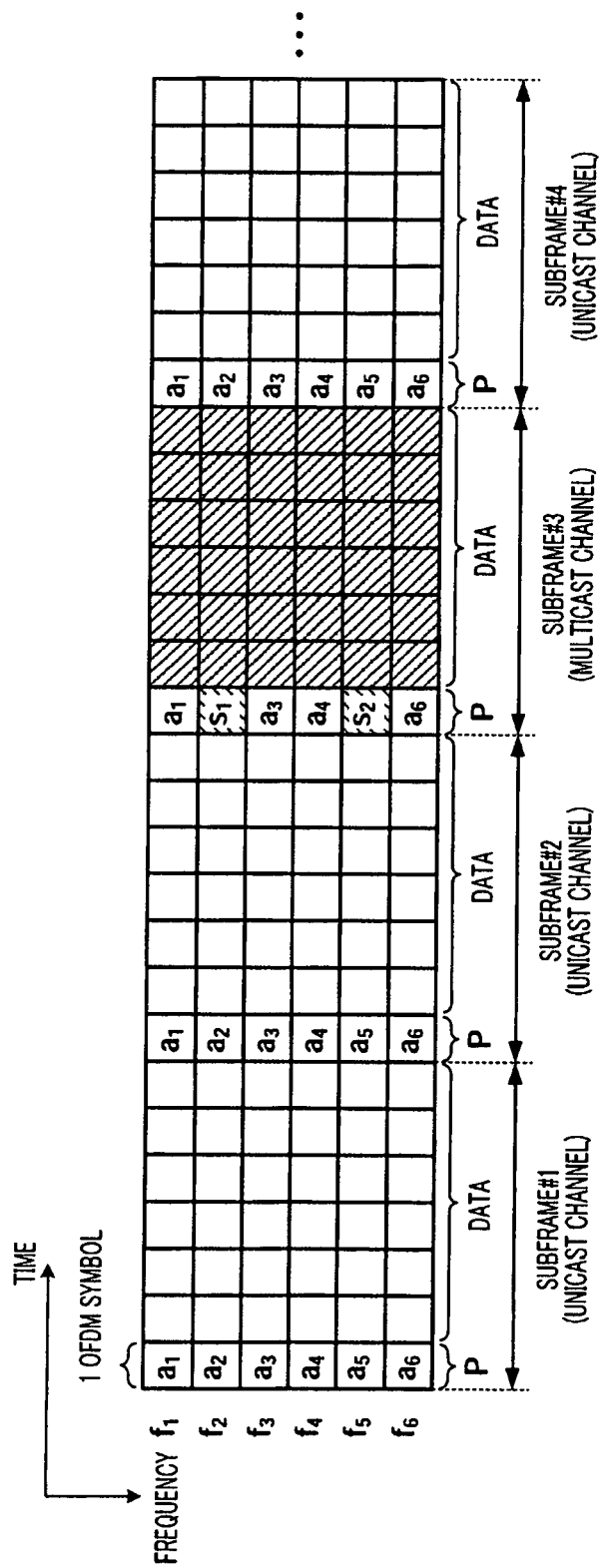
FIG. 10 illustrates an example of pilot sequence multiplexing according to Embodiment 1 of the present invention (variation 1)
Figure 11:
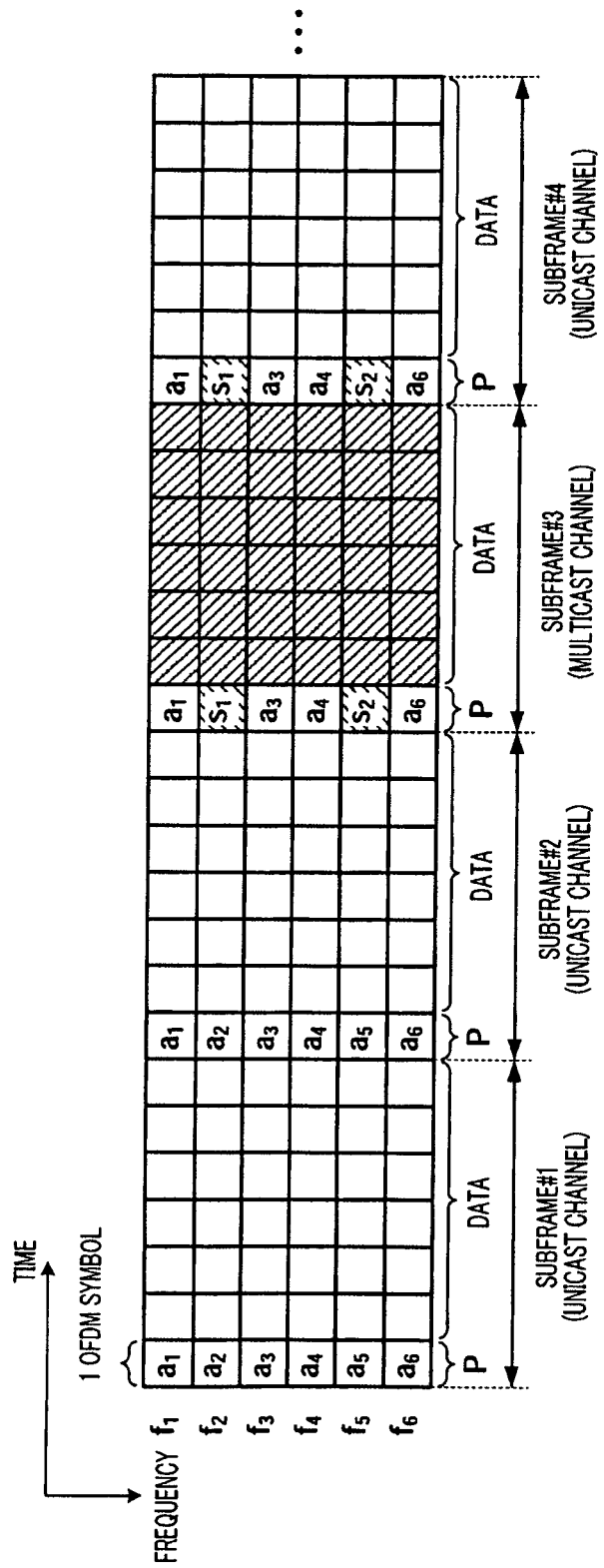
FIG. 11 illustrates an example of pilot sequence multiplexing according to Embodiment 1 of the present invention (variation 2)
Figure 12:
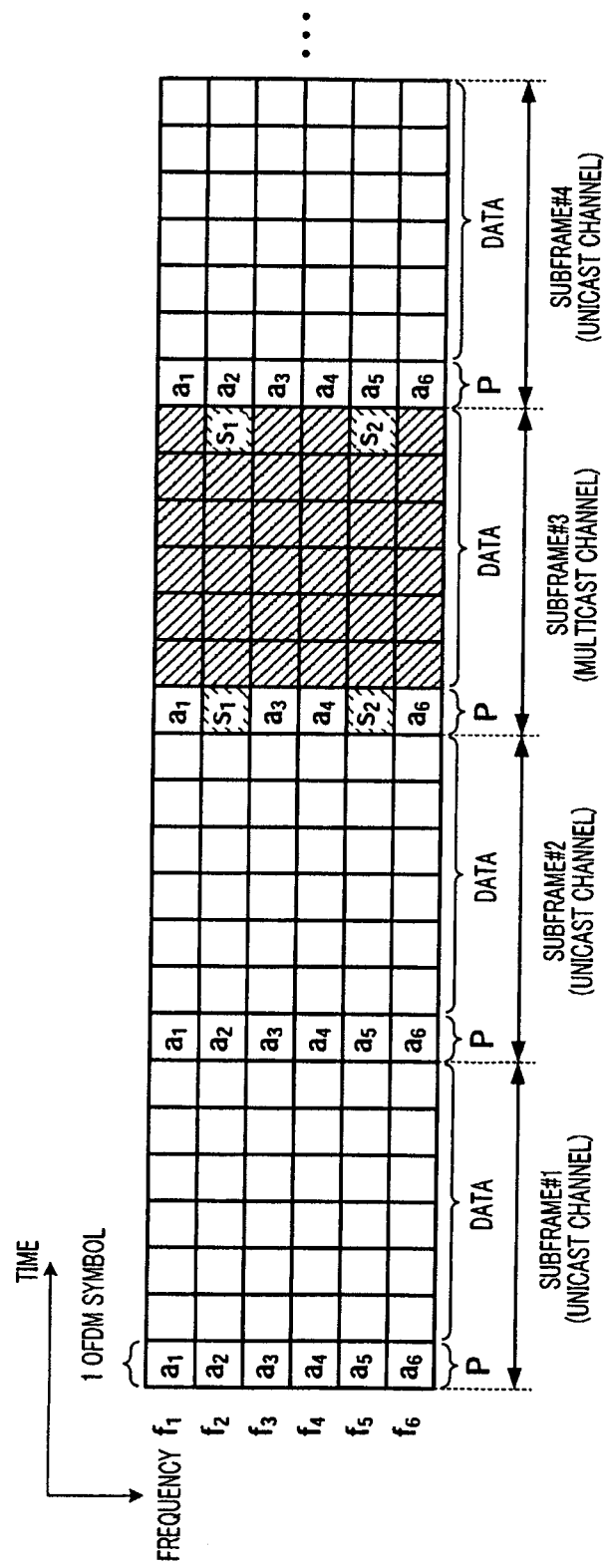
FIG. 12 illustrates an example of pilot sequence multiplexing according to Embodiment 1 of the present invention (variation 3)

Further, although a case has been described with the above explanations where a pilot sequence including both the pilot for unicast subframes and the pilot for multicast subframes, is multiplexed over the head of all subframes as shown in FIG. 4. However, interference is not caused between base stations in the multicast subframes and multicast data is likely to be modulated by a modulation scheme with a low M-ary number such as a QPSK modulation. Consequently, a multicast data symbol has little influence on channel fluctuation. Therefore, as shown in FIG. 10, a pilot sequence including both the pilot for unicast subframes and the pilot for multicast subframes, may be multiplexed over only the head of multicast subframes, and a pilot sequence comprised of only pilots for unicast subframes may be multiplexed over the heads of unicast subframes. Alternatively, as shown in FIG. 11, a pilot sequence including both the pilot for unicast subframes and the pilot for multicast subframes, may be multiplexed over only the head of a multicast subframe and the head of a unicast subframe immediately after the multicast subframe, and the pilot sequence comprised of only pilots for unicast subframes may be multiplexed over the head of the rest of unicast subframes. Alternatively, as shown in FIG. 12, a pilot sequence including both the pilot for unicast subframes and the pilot for multicast subframes is multiplexed over only the head of multicast subframes, and the pilot sequence comprised of only pilots for multicast subframes is multiplexed over the tail ends of multicast subframes, and the pilot sequence comprised of only pilots for unicast subframes may be multiplexed over the heads of unicast subframes. By this means, the number of pilots for unicast subframes in the frequency domain can be increased, so that it is possible to improve the accuracy of channel estimations for a unicast data symbol. Further, in this case, replacing section 301 shown in FIG. 8 performs the above-noted processing, and further directly outputs a unique sequence or a common sequence to scrambling section 105 as a scrambling sequence, and scrambling section 105 multiplies the outputted scrambling sequence with the pilot signal sequence and generates the pilot sequence comprised of pilots for unicast subframes or pilots for multicast subframes.

Figure 13:
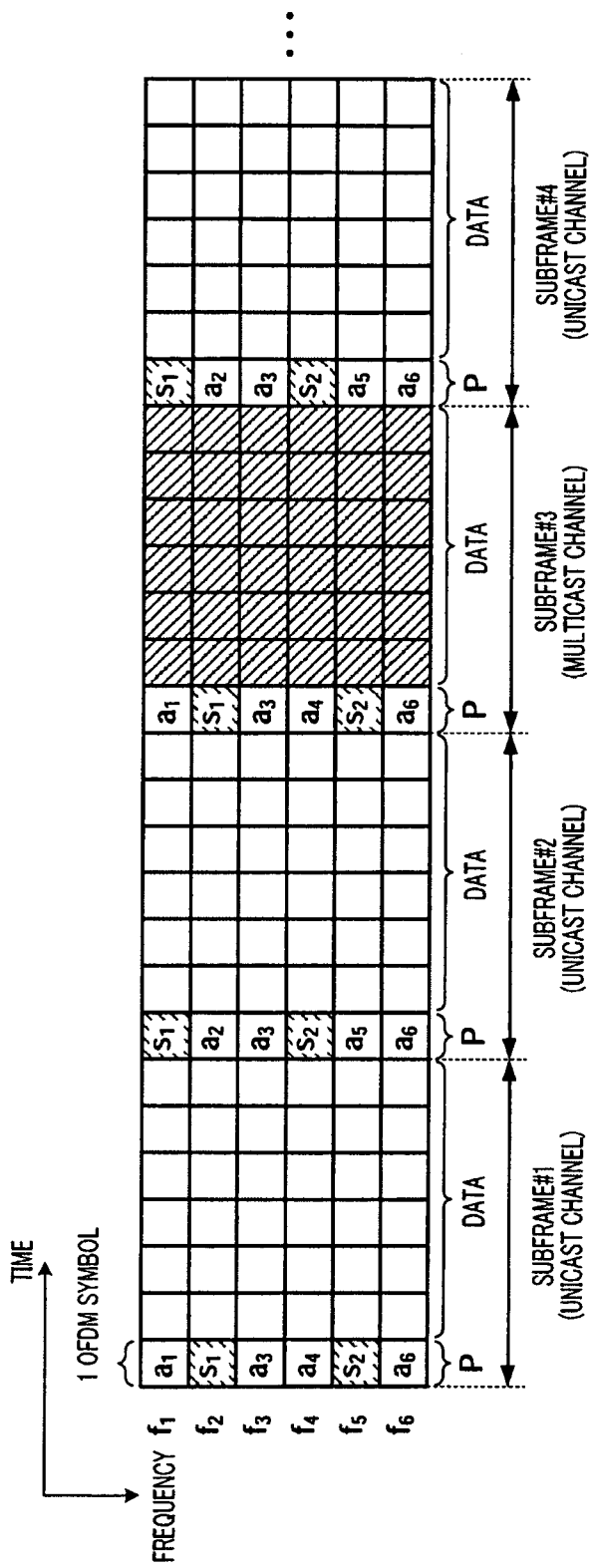
FIG. 13 illustrates an example of pilot sequence multiplexing according to Embodiment 1 of the present invention (variation 4)

Further, as shown in FIG. 4, although a case has been described with above explanation where the positions of pilots for multicast subframes are the same in the frequency domain (subcarriers $f_2$, $f_5$ in FIG. 4), these positions may change between subframes as shown in FIG. 13. That is, a plurality of pilot sequences where the positions of pilots for multicast subframes in the pilot sequence differ between pilot sequences, may be multiplexed over the heads of unicast subframes and multicast subframes. By this means, subcarriers without the pilot for multicast subframes, that is, subcarriers where the accuracy of channel estimation is low are not consecutive over a plurality of subframes, so that the accuracy of channel estimation is uniform for all subcarriers and error rate performances can be improved. Further, in this case, replacing section 301 shown in FIG. 8 performs the above-noted processing, and further changes the positions of chips replaced by the common sequence on a per subframe basis, out of the unique sequence, upon replacing part of the unique sequence by the common sequence. By this means, scrambling section 105 can generate a plurality of pilot sequences where the positions of pilots for multicast subframes differ between subframes.

Figure 14:
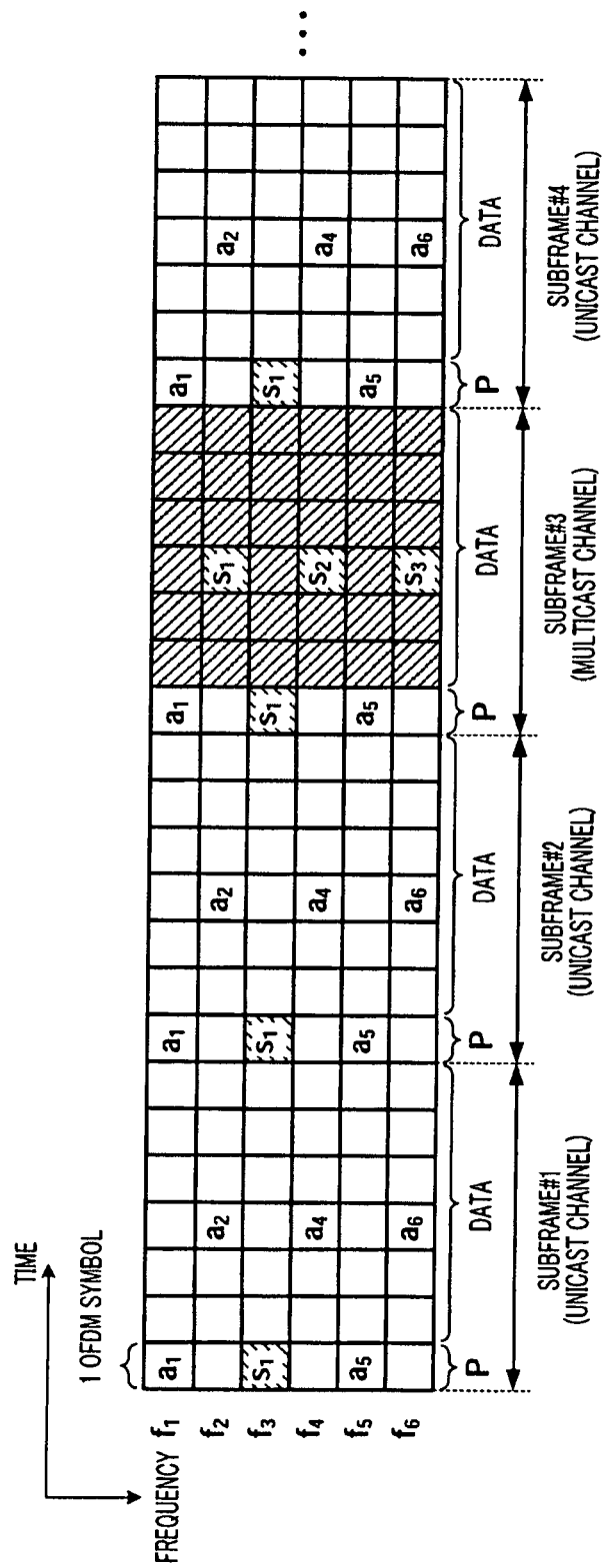
FIG. 14 illustrates an example of pilot sequence multiplexing according to Embodiment 1 of the present invention (variation 5)

Further, to improve the accuracy of interpolation for channel estimation values in the time domain, as shown in FIG. 14, the pilot sequence may be multiplexed over positions other than the heads of subframes, in addition to the heads of subframes. In this case, only channel estimation values with respect to unicast data symbols are needed in unicast subframes, and only channel estimation values with respect to multicast subframes are needed in multicast subframes. Consequently, as shown in FIG. 14, while a pilot sequence including both the pilot for unicast subframes and the pilot for multicast subframes is multiplexed over the head of each subframe, the pilot sequence multiplexed over positions other than the head of unicast subframes is comprised of only pilots for unicast subframes in unicast subframes, and the pilot sequence multiplexed over positions other than the head of the multicast subframes is comprised of only pilots for multicast subframes in multicast subframes.

Further, while pilots are not mapped in all subcarriers in one OFDM symbol, as shown in FIG. 14, pilots may be mapped intermittently. FIG. 14 illustrates an example of mapping pilots every second subcarriers. In this case, a data symbol is mapped in a subcarrier in which pilots are not mapped over the head of each subcarrier.

Figure 15:
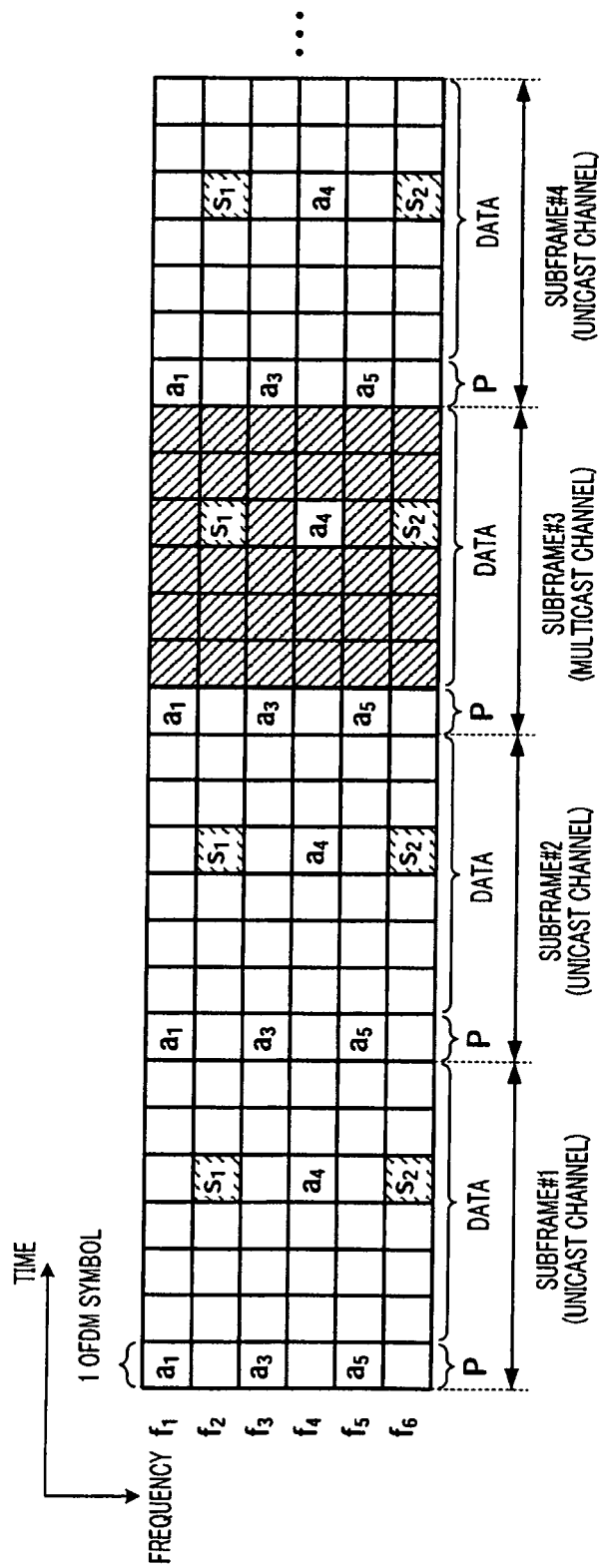
FIG. 15 illustrates an example of pilot sequence multiplexing according to Embodiment 1 of the present invention (variation 6)

Further, pilots may be multiplexed as shown in FIG. 15 instead of FIG. 14. The example shown in FIG. 15 is different from that of FIG. 14 in multiplexing a pilot sequence including both the pilot for unicast subframes and the pilot for multicast subframes, over positions other than the head of each subframe, while a pilot sequence comprised of only pilots for unicast subframes is multiplexed over the head of subframe.

Embodiment 2

According to Embodiment 1, channel estimation value $g_i$ calculated when a channel estimation is performed for multicast data, is a channel estimation value comprised of channel estimation value $h_i$ for cell A and channel estimation value $l_i$ for cell B, and, consequently, this calculated channel estimation value cannot be used for channel estimation for unicast data.

Therefore, with the present embodiment, out of the unique sequence and the common sequence included in the scrambling sequence, a phase rotation that is unique to a base station and that differs between cells is applied to the common sequence.

Figure 16:
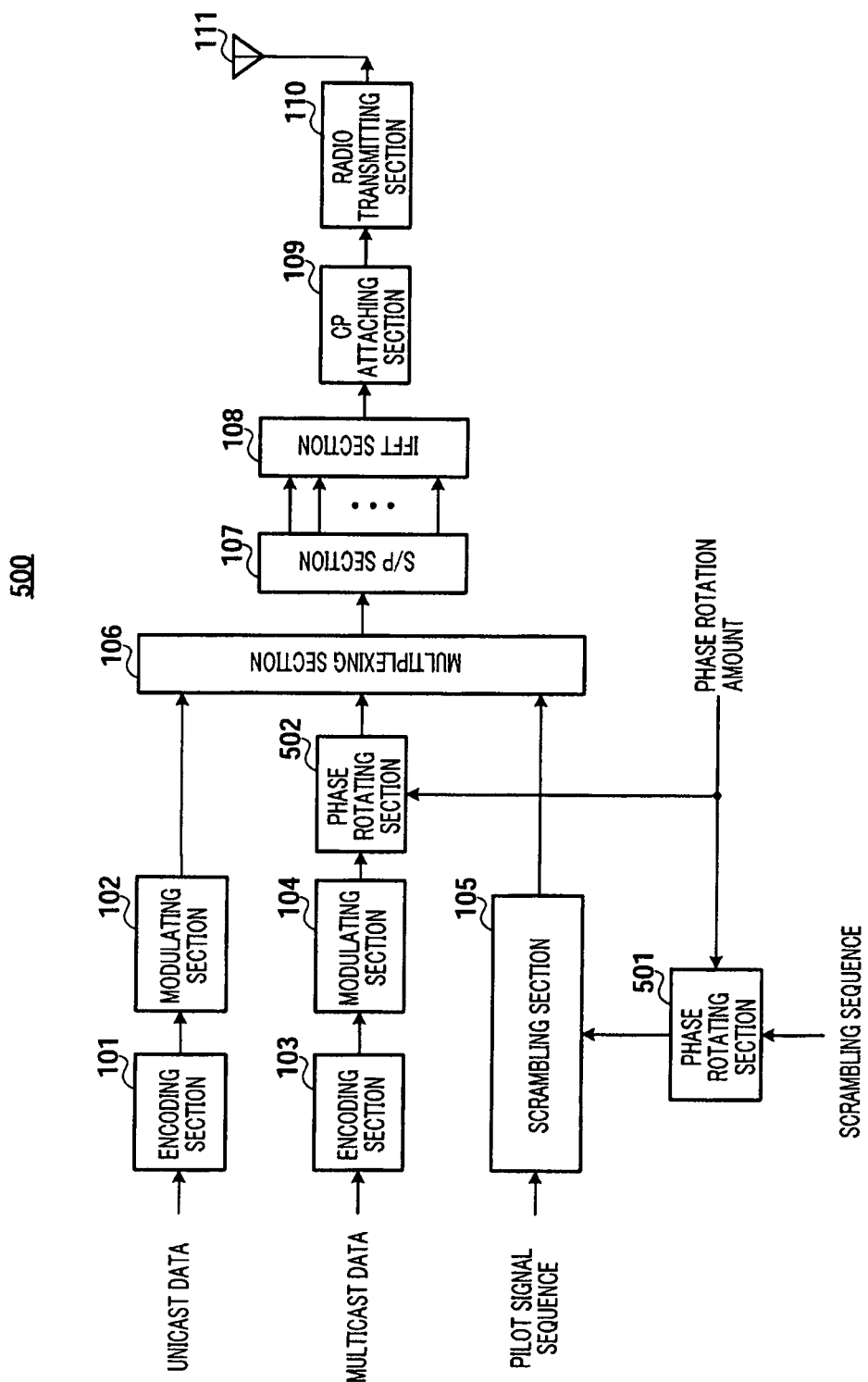
FIG. 16 is a block configuration diagram showing a base station according to Embodiment 2 of the present invention.

FIG. 16 illustrates the configuration of base station 500 according to the present embodiment. Base station 500 employs a configuration having phase rotating sections 501 and 502 in addition to the configuration shown in Embodiment 1 (FIG. 2). Here, in FIG. 16, the same components as in FIG. 2 will be assigned the same reference numerals and detail explanations thereof will be omitted.

In base station 500 shown in FIG. 16, phase rotating section 501 applies a phase rotation that is unique to base station 500 and that differs between cells, that is, between base stations, to the common sequence, out of the unique sequence and the common sequence included in the scrambling sequence. If the common sequence is comprised of chips $s_1, s_2, s_3, \ldots, s_M$ and the phase rotation amount unique to base station 500 is $\theta$, the common sequence after phase rotation is comprised of $s_1 \cdot \exp(j\theta), s_2 \cdot \exp(j\theta), s_3 \cdot \exp(j\theta), \ldots, s_M \cdot \exp(j\theta)$. The scrambling sequence including the common sequence subjected to phase rotation is then inputted to scrambling section 105.

As described above, by applying a phase rotation that is unique to base station 500 and that differs between cells to the common sequence, it is possible to distinguish the pilot for multicast subframes in cell A and the pilot for multicast subframes in cell B. By this means, in a mobile station, channel estimation value $h_i$ in cell A and channel estimation value $l_i$ in cell B can be calculated from the received pilots for multicast subframes, so that it is possible to perform a channel estimation for unicast data using one of these channel estimation values $h_i$ and $l_i$. By this means, it is possible to improve the accuracy of channel estimation for unicast data.

In this case, a phase rotation is applied to the common sequence, and, consequently, a mobile station cannot use a channel estimation value calculated from pilots for multicast subframes itself for channel estimation for multicast data. Phase rotating section 502 then applies the same amount of phase rotation as the phase rotation amount for the common sequence, to multicast data symbol. By this means, by applying the same phase rotation as for the common sequence to multicast data symbol, the phase of the pilot for multicast subframes matches the phase of the multicarrier data symbol, so that, in a mobile station, it is possible to perform a channel estimation for multicast data using a channel estimation value calculated from pilots for multicast subframes.

Thus, according to the present embodiment, $s_1$, $s_2$ and multicast data for subframe #3 shown in FIG. 4 are multiplied by $\exp(j\theta_a)$, and $s_1$, $s_2$ and multicast data for subframe #3 shown in FIG. 5 are multiplied by $\exp(j\theta_a)$.

Further, the phase rotation amount unique to a base station is set in advance in each base station or is reported from a control station that is higher than base stations.

Further, the mobile station according to the present embodiment differs from Embodiment 1 only in the operation of pilot selecting section 207. That is, with the present embodiment, when a channel estimation is performed for unicast data, pilot selecting section 207 selects all pilots included in the received pilot sequence and outputs these selected pilots to channel estimating section 208.

Figure 17:
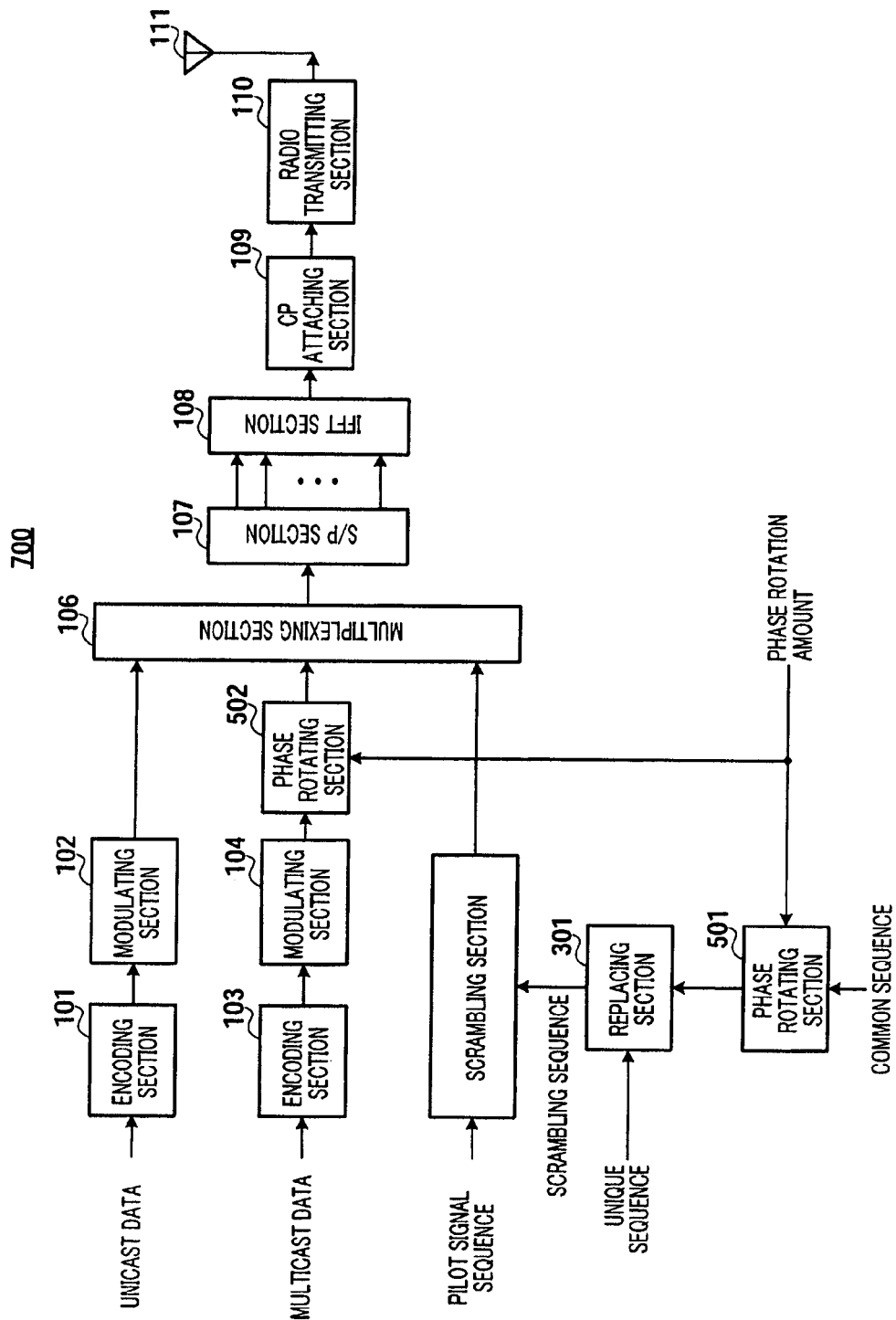
FIG. 17 is a block configuration diagram showing a base station according to Embodiment 2 of the present invention (variation)

Although a case has been described with the above explanation where a scrambling sequence generated in advance is set in advance in base station 500 and does not change, in a radio communication system where the unique sequence (scrambling code) may be changed by a control station that is higher than base station 500, the configuration of the base station may be set as shown in FIG. 17. Base station 700 shown in FIG. 17 employs a configuration having replacing section 301 in addition to the configuration shown in FIG. 16. This replacing section 301 is the same as in Embodiment 1 (FIG. 8) and detailed explanations thereof will be omitted.

Further, although a case has been described with the above explanation where the number of amounts of phase rotation unique to base station 500 is one, that is, the amount of phase rotation unique to base station 500 of cell A is $\theta_a$ and the amount of phase rotation unique to base station 500 of cell B is $\theta_b$, one base station may use a plurality of amounts of phase rotation. For example, base station 500 of cell A may use phase rotation amounts $\theta_{a1}$, $\theta_{a2}$, and base station 500 of cell B may use phase rotation amounts $\theta_{b1}$, $\theta_{b2}$. In this case, for example, in FIG. 4, $s_1$ and multicast data for subcarriers $f_1$ to $f_3$ in subframe 3 may be multiplied by $\exp(j\theta_{a1})$ and $s_2$ and multicast data for subcarriers $f_4$ to $f_6$ in subframe #3 may be multiplied by $\exp(j\theta_{a2})$, and, in FIG. 5, $s_1$ and multicast data for subcarriers $f_1$ to $f_3$ in subframe 3 may be multiplied by $\exp(j\theta_{b1})$ and $s_2$ and multicast data for subcarriers $f_4$ to $f_6$ in subframe #3 may be multiplied by $\exp(j\theta_{b2})$. By this means, it is possible to randomize interference between pilots for multicast subframes in each cell.

Embodiment 3

A case will be explained below with the present embodiment where different multicast data is transmitted per cell group comprised of a plurality of cells. According to the present embodiment, for example, as shown in FIG. 18, in a case where cells A to G form cell group 1 and cells H to N form cell group 2, while multicast data 1 is transmitted in cells A to G of cell group 1, multicast data 2, which is different from multicast data 1, is transmitted in cells H to N of cell group 2.

Figure 18:
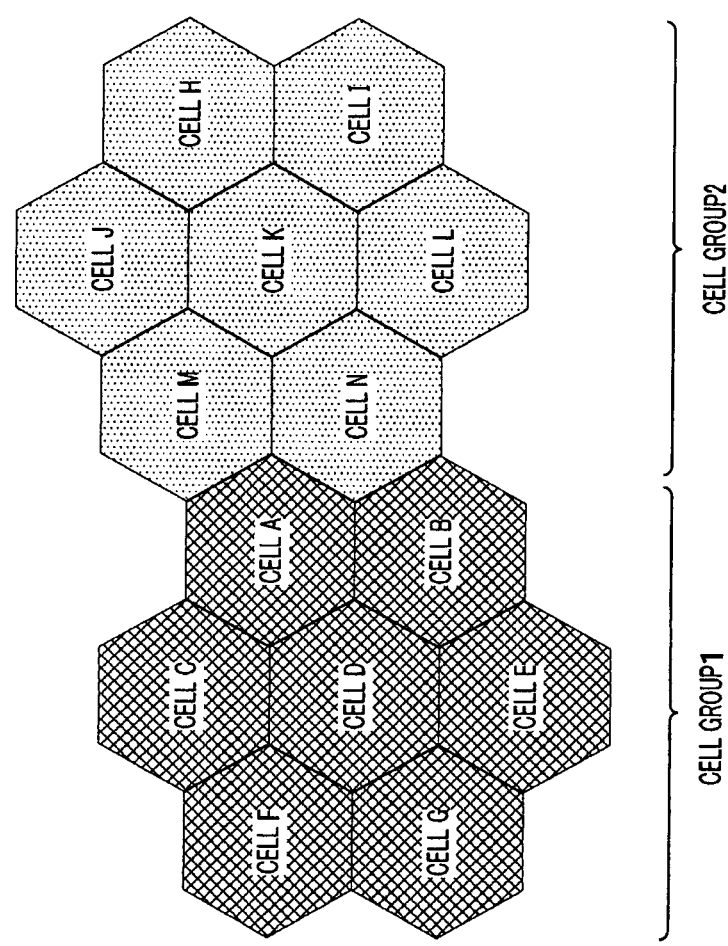
FIG. 18 illustrates a cell group structure according to Embodiment 3 of the present invention.

In this case, if pilots for multicast subframes are mapped in the same positions in all cells, the accuracy of channel estimation for multicast data is assumed to degrade in cells nearby the cell group boundary (cells A, B, M and N in FIG. 18). For example, the accuracy of channel estimation for multicast data 1 is assumed to degrade in cells A and B in cell group 1, and, further, the accuracy of channel estimation for multicast data 2 is assumed to degrade in cells M and N in cell group 2. This is caused by the greater interference between adjacent groups in pilots for multicast subframes in cells nearby the cell group boundary, if pilots for multicast subframes are mapped in the same positions in all cells of adjacent cell groups. For example, pilots for multicast subframes in cells A and B receive the significant interference from pilots for multicast subframes in cell group 2, and, similarly, pilots for multicast subframes in cells M and N receive the significant interference from pilots for multicast subframes in cell group 1.

Figure 19:
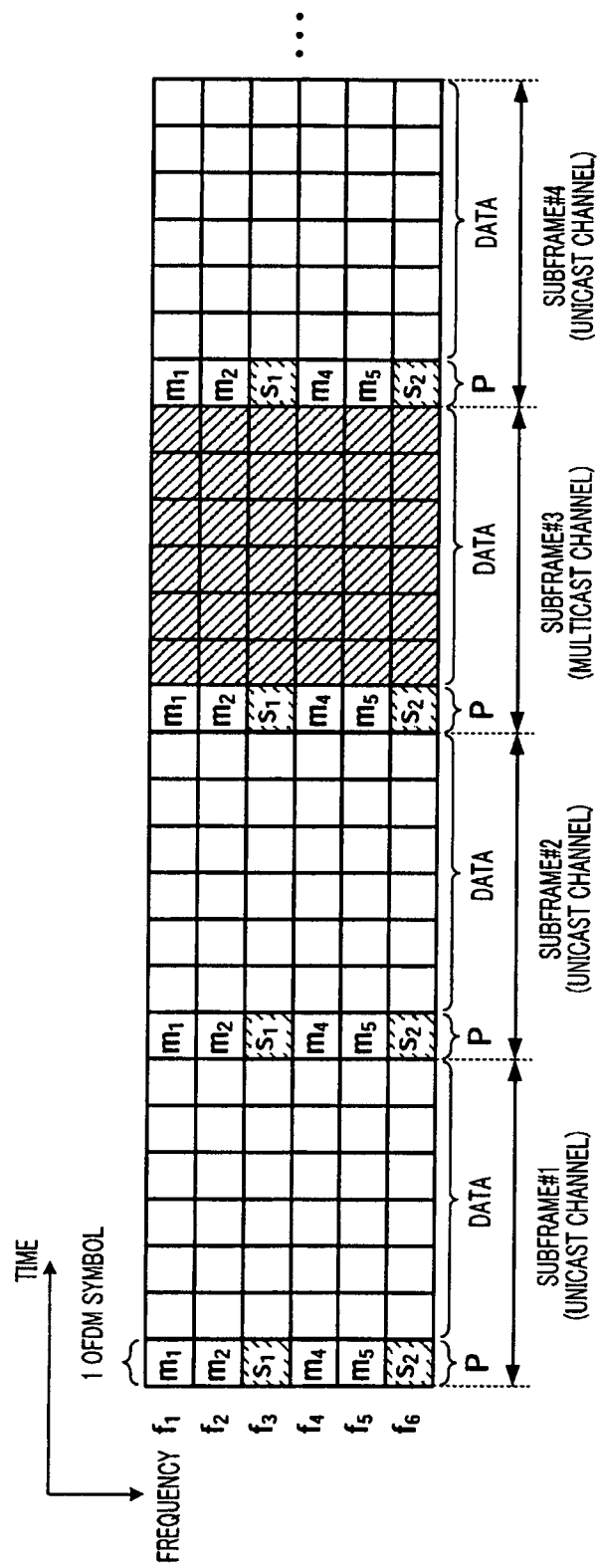
FIG. 19 illustrates an example of pilot sequence multiplexing according to Embodiment 3 of the present invention (cell M)
Figure 20:
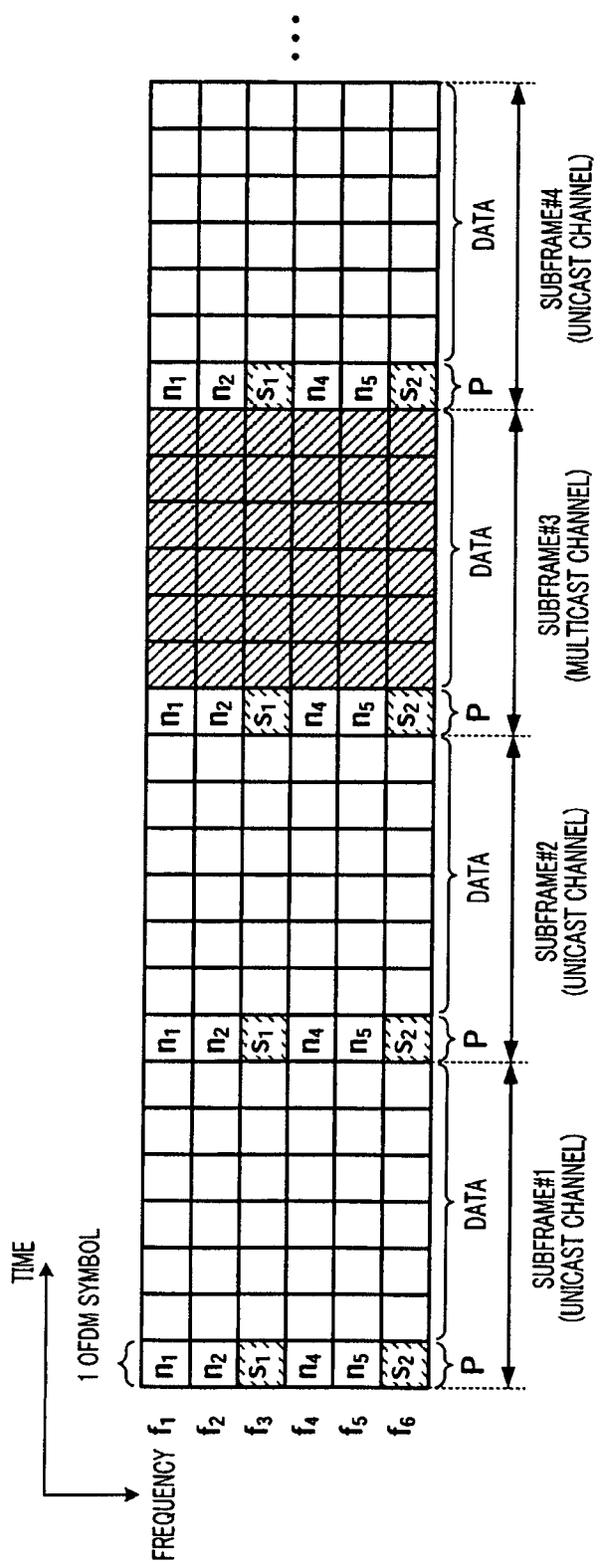
FIG. 20 illustrates an example of pilot sequence multiplexing according to Embodiment 3 of the present invention (cell N)

Therefore, according to the present embodiment, when the pilot sequence $a_1$, $s_1$, $a_3$, $a_4$, $s_2$, $a_6$ is multiplexed in cell A as shown in FIG. 4 and the pilot sequence $b_1$, $s_1$, $b_3$, $b_4$, $s_2$, $b_6$ is multiplexed in cell B as shown in FIG. 5, the pilot sequence $m_1$, $m_2$, $s_1$, $m_4$, $m_5$, $s_2$ is multiplexed in cell M as shown in FIG. 19 and the pilot sequence $n_1$, $n_2$, $s_1$, $n_4$, $n_5$, $s_2$ is multiplexed in cell N as shown in FIG. 20. That is, according to the present embodiment, the positions of pilots for multicast subframes in the frequency domain differ between adjacent cell groups. By this means, interference between adjacent groups is reduced with respect to pilots for multicast subframes, so that it is possible to prevent degradation of the accuracy of channel estimation for multicast data in cells nearby the cell group boundary. Further, similarly, it is possible to prevent degradation of the accuracy of channel quality measurement for multicast channel.

Figure 21:
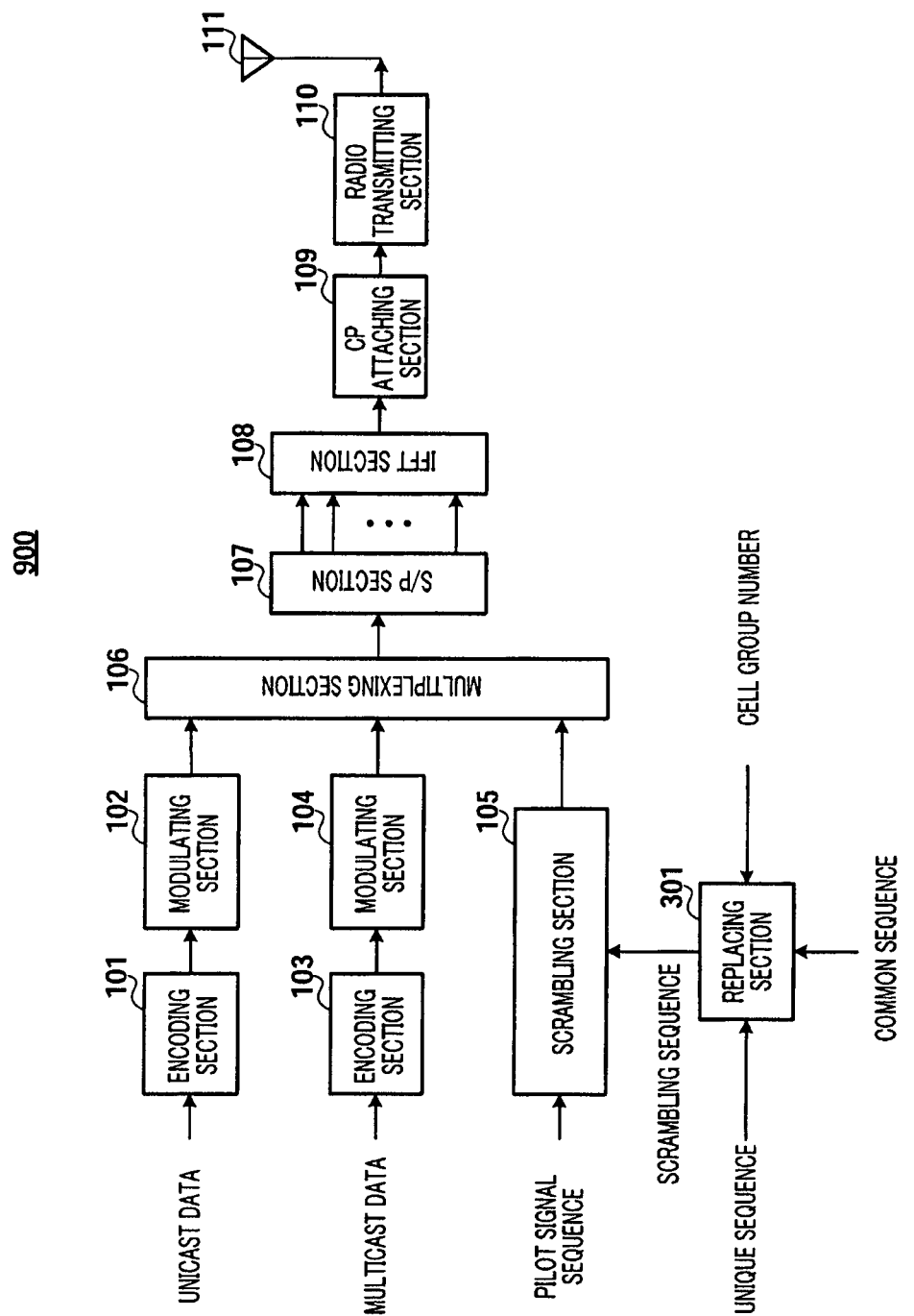
FIG. 21 is a block configuration diagram showing a base station according to Embodiment 3 of the present invention.

FIG. 21 illustrates the configuration of base station 900 according to the present embodiment. Replacing section 301 according to the present embodiment differs from replacing section 301 of base station 300 in FIG. 8 in that, upon replacing part of a unique sequence by a common sequence, the positions of chips in the unique sequence replaced by the common sequence differ between cell groups according to the cell group number. For example, replacing section 301 of base station 900 in cell A receives as input cell group number 1 and replaces $a_2$ by $s_1$ and $a_5$ by $s_2$ in the pilot sequence $a_1$, $a_2$, $a_3$, $a_4$, $a_5$, $a_6$. Similarly, replacing section 301 of base station 900 in cell B receives as input cell group number 1 and replaces $b_2$ by $s_1$ and $b_5$ by $s_2$ in the pilot sequence $b_1$, $b_2$, $b_3$, $b_4$, $b_5$, $b_6$.

On the other hand, replacing section 301 of base station 900 in cell M receives as input cell group number 2 and replaces $m_3$ by $s_1$ and $m_6$ by $s_2$ in the pilot sequence $m_1$, $m_2$, $m_3$, $m_4$, $m_5$, $m_6$. Similarly, replacing section 301 of base station 900 in cell N receives as input cell group number 2 and replaces $n_3$ by $s_1$ and $n_6$ by $s_2$ in the pilot sequence $n_1$, $n_2$, $n_3$, $n_4$, $n_5$, $n_6$.

Base station 900 employs the above-described configuration so that it is possible to vary the positions of pilots for multicast subframes in the frequency domain between adjacent cell groups.

Embodiment 4

Although a case has been described with the above-described embodiments where a base station provides one antenna, a case will be explained with the present embodiment where a base station provides a plurality of antennas and transmits multicast data from a plurality of antennas in one cell.

Figure 22:
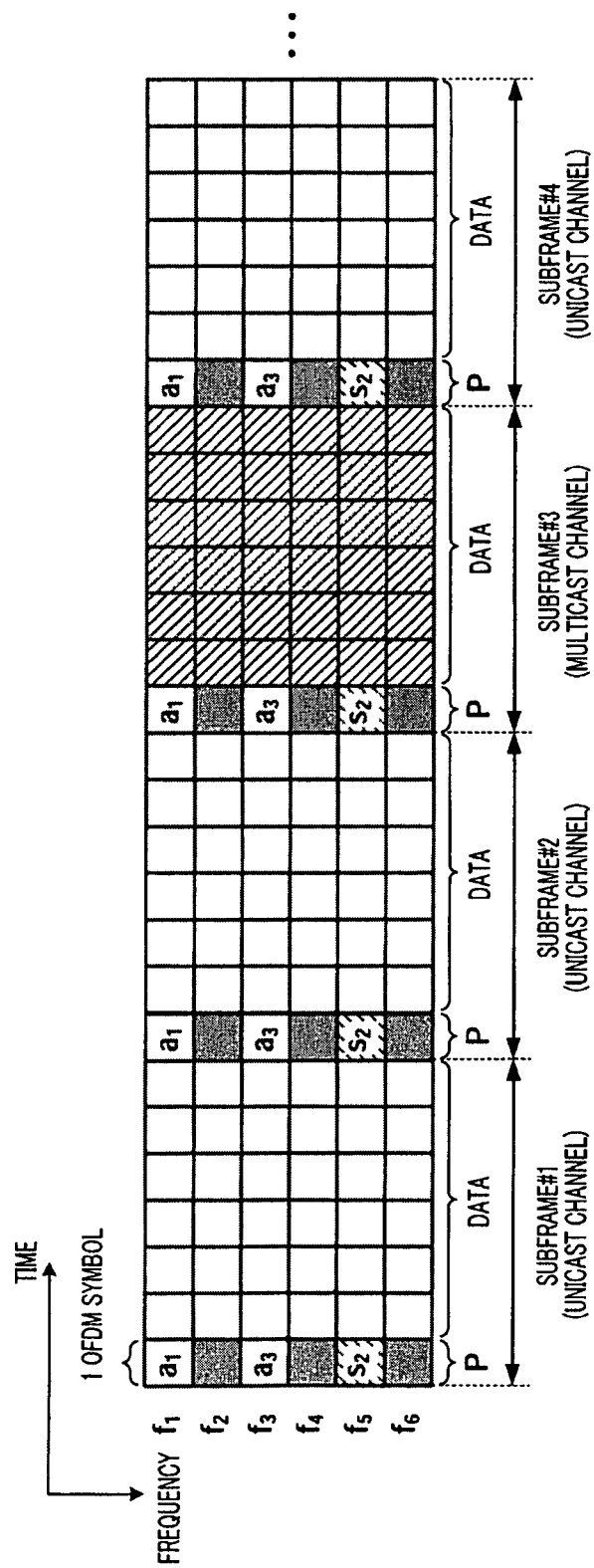
FIG. 22 illustrates an example of pilot sequence multiplexing according to Embodiment 4 of the present invention (antenna #1)
Figure 23:
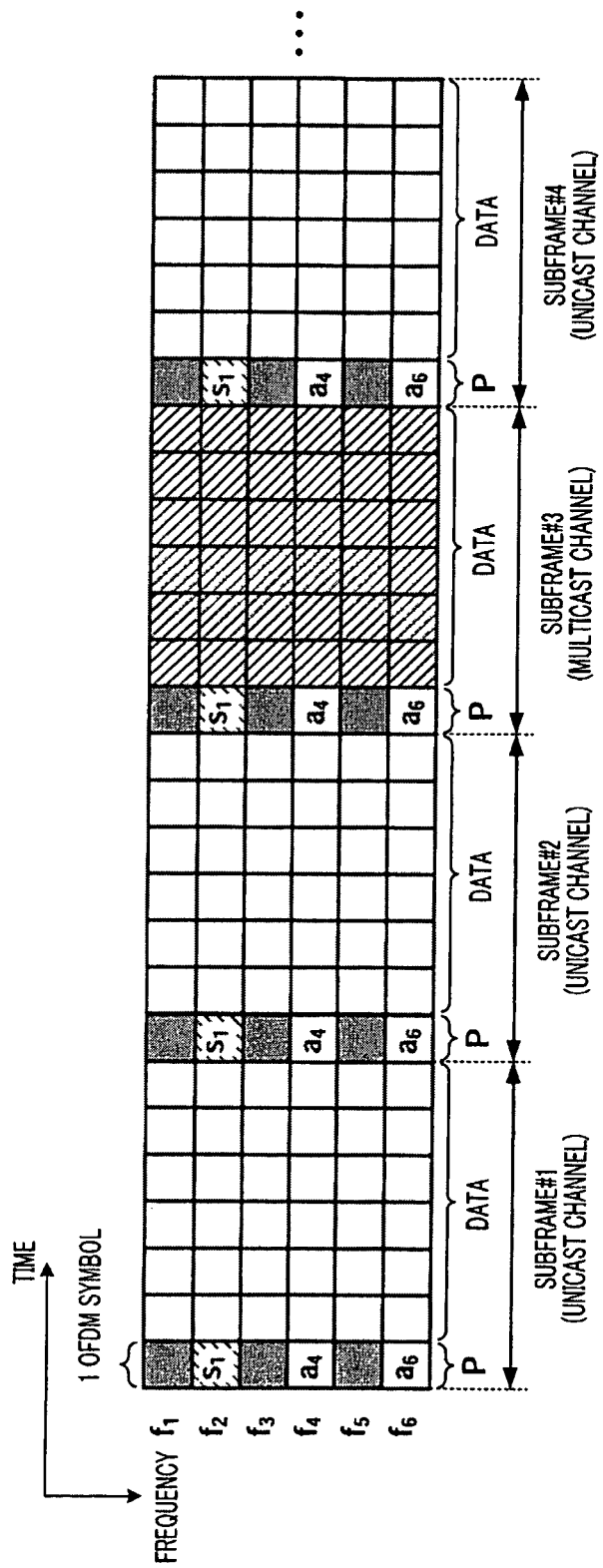
FIG. 23 illustrates an example of pilot sequence multiplexing according to Embodiment 4 of the present invention (antenna #2).

For example, if the base station in cell A provides two antennas, that is, antennas #1 and #2, with the present embodiment, the pilot sequence $a_1$, null, $a_3$, null, $s_2$, null shown in FIG. 22 is multiplexed over the head of each subframe transmitted from antenna #1, and the pilot sequence null, $s_1$, null, $a_4$, null, $a_6$ shown in FIG. 23 is multiplexed over the head of each subframe transmitted from antenna #2. In a mobile station that receives two pilot sequences simultaneously transmitted from antennas #1 and #2, by combining these pilot sequences, the plot sequence shown in FIG. 4 is yielded. Therefore, even when a base station provides a plurality of antennas and multicast data is transmitted from the plurality of antennas in one cell, by dividing a pilot sequence and transmitting part of the pilot sequence from the plurality of antennas as described above, it is possible to acquire the same operational effect of the above-described embodiments.

Embodiments of the present invention has been described above.

Further, by replacing the above-described "multicast" by "broadcast," it is possible to implement the present invention in the same way as above in a radio communication system where the unicast channel and the broadcast channel are switched and used over time. While multicast communication employs a communication method of transmitting information only to a specific mobile station subscribing services such as news group, broadcast communication employs a communication method of transmitting information to all mobile stations in the same way as television broadcast and radio broadcast. Further, a combination of the multicast channel and the broadcast channel may be referred to as "MBMS (Multimedia Broadcast/Multicast Services channel."

Further, the present invention can be implemented in the same way as above using common channels other than the multicast channels between multiple sectors, such as PCH (paging channel) and BCH (broadcast channel).

Further, pilots for unicast subframes, used in the above-described embodiments, may be common pilots or dedicated pilots.

Further, subframes used in the above-described embodiments may be referred to as "TTI," which means transmission time interval. Further, CP may be referred to as "GI," which means a guard interval. Further, a subcarrier may be referred to as a "tone." Further, a base station and a mobile station may be referred to as "Node B" and "UE," respectively. Further, a pilot may be referred to as a "preference signal." Further, a multicast channel may be referred to as "SFN channel," which means a single frequency network channel. Further, subframes used in the above-described embodiments may be other transmission time units such as time slots and frames.

Further, a case has been described with the above-described embodiments where the present invention is implemented between cells the present invention can also be implemented in the same way as above between several sectors generated by dividing one cell.

Further, although a case has been described with the above-described embodiments where the multicast channel and the unicast channel are separated and time-multiplexed on a per subframe basis, the present invention can also be implemented in the same way as above even when the multicast channel and the unicast channel are separated by frequency or time in the same subframe. In this case, the present invention may be applied to only subcarriers over which a multicast channel is multiplexed.

Although a case has been described with the above embodiments as an example where the present invention is implemented with hardware, the present invention can be implemented with software.

Furthermore, each function block employed in the description of each of the aforementioned embodiments may typically be implemented as an LSI constituted by an integrated circuit. These may be individual chips or partially or totally contained on a single chip. "LSI" is adopted here but this may also be referred to as "IC," "system LSI," "super LSI," or "ultra LSI" depending on differing extents of integration.

Further, the method of circuit integration is not limited to LSI's, and implementation using dedicated circuitry or general purpose processors is also possible. After LSI manufacture, utilization of an FPGA (Field Programmable Gate Array) or a reconfigurable processor where connections and settings of circuit cells in an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The present application is based on Japanese Patent Application No. 2005-295446, filed on Oct. 7, 2005, and Japanese Patent Application No. 2006-273583, filed on Oct. 5, 2006, the entire content of which is expressly incorporated by reference herein.

INDUSTRIAL APPLICABILITY

The present invention is applicable to, for example, mobile communication systems.

The invention claimed is:

1. A radio communication base station apparatus comprising:
   a generating section that generates a first pilot sequence, which is comprised of both a common pilot and a specific pilot, the common pilot being the same between the plurality of cells or the plurality of sectors, and the specific pilot being different between the plurality of cells or the plurality of sectors; and
   a multiplexing section that places the first pilot sequence in a second subframe, the second subframe being used to transmit mutually the same data between a plurality of cells or a plurality of sectors, that is subsequent to a first subframe, the first subframe being used to transmit mutually different data between a plurality of cells or a plurality of sectors, and the first subframe and the second subframe being time-multiplexed with each other.

2. The radio communication base station apparatus according to claim 1, wherein unicast data is placed in the first subframe and multicast data is placed in the second subframe.

3. The radio communication base station apparatus according to claim 1, wherein the generating section generates the first pilot sequence such that, in the first pilot sequence, a number of the specific pilots is greater than a number of the common pilots.

4. The radio communication base station apparatus according to claim 1, wherein the generating section generates the first pilot sequence by multiplying a predetermined pilot signal sequence by a scrambling sequence, the scrambling sequence being comprised of both a first sequence that differs between the plurality of cells or the plurality of sectors, and a second sequence common in the plurality of cells or the plurality of sectors.

5. The radio communication base station apparatus according to claim 4, wherein the first sequence and the second sequence are comprised of a plurality of first codes and a plurality of second codes, respectively, and the scrambling sequence is generated by replacing a part of the first codes included in the first sequence by the second codes included in the second sequence.

6. The radio communication base station apparatus according to claim 1, wherein the generating section generates the first pilot sequence by multiplying a predetermined pilot signal sequence that differs between sectors forming a cell by a scrambling sequence, the scrambling sequence being comprised of both a first sequence that differs between the plurality of cells and a second sequence common in the plurality of cells.

7. The radio communication base station apparatus according to claim 6, wherein the first sequence and the second sequence are comprised of a plurality of first codes and a plurality of second codes, respectively, and the scrambling sequence is generated by replacing a part of the first codes included in the first sequence by the second codes included in the second sequence.

8. The radio communication base station apparatus according to claim 1, wherein the multiplexing section further places the first pilot sequence in the first subframe.

9. The radio communication base station apparatus according to claim 1, wherein the generating section generates the first pilot sequence by arranging the common pilots with intervals in the first pilot sequence and the intervals between the common pilots in the frequency domain stay within a coherent bandwidth of a channel.

10. The radio communication base station apparatus according to claim 1, wherein:
the generating section further generates a second pilot sequence, in which only the specific pilot is arranged; and
the multiplexing section places the first pilot sequence in the second subframe and the first subframe immediately after the second subframe, and places the second pilot sequence in other of the first subframes.

11. The radio communication base station apparatus according to claim 1, wherein:
the generating section generates the first pilot sequence by arranging the common pilot in a predetermined position within the first pilot sequence, and generates a plurality of the first pilot sequences, the predetermined position where the common pilot is arranged within each of the first pilot sequences being different between the first pilot sequences; and
the multiplexing section places the plurality of first pilot sequences in the first subframe and the second subframe, respectively.

12. The radio communication base station apparatus according to claim 1, wherein:
the generating section further generates a second pilot sequence, in which only the specific pilot is arranged; and
the multiplexing section places the first pilot sequence at a head of the first subframe, and further places, in the first subframe, the second pilot sequence at positions other than the head.

13. The radio communication base station apparatus according to claim 1, wherein:
the generating section further generates a third pilot sequence, in which only the common pilot is arranged; and
the multiplexing section places the first pilot sequence at a head of the second subframe and places, in the second subframe, the third pilot sequence at positions other than the head.

14. The radio communication base station apparatus according to claim 1, further comprising a phase rotating section that applies a phase rotation that differs between the plurality of cells or the plurality of sectors, to both the common pilot and the same data.

15. A pilot transmission method comprising:
transmitting a pilot sequence, which is comprised of both a common pilot and a specific pilot, in a second subframe, the second subframe being used to transmit mutually the same data between a plurality of cells or a plurality of sectors, that is subsequent to a first subframe, the first subframe being used to transmit mutually different data between a plurality of cells or a plurality of sectors, and the first subframe and the second subframe being time-multiplexed with each other, wherein the common pilot is the same between the plurality of cells or the plurality of sectors, and the specific pilot is different between the plurality of cells or the plurality of sectors.

16. A radio communication mobile station apparatus comprising:
a receiving section that receives a first pilot sequence, which is comprised of both a common pilot and a specific pilot, in the second subframe subsequent to the first subframe, the common pilot being the same between the plurality of cells or the plurality of sectors, and the specific pilot being different between the plurality of cells or the plurality of sectors, the first subframe being used to transmit mutually different data between a plurality of cells or a plurality of sectors and the second subframe being used to transmit mutually the same data between a plurality of cells or a plurality of sectors, the first subframe and the second subframe being time-multiplexed with each other; and
a channel estimating section that performs channel estimation based on the first pilot sequence.

* * * * *